US006539464B1

(12) United States Patent
Getov

(10) Patent No.: US 6,539,464 B1
(45) Date of Patent: Mar. 25, 2003

(54) MEMORY ALLOCATOR FOR MULTITHREAD ENVIRONMENT

(76) Inventor: Radoslav Nenkov Getov, 551 Oaklynn Ct., Apt. #13, Pittsburgh, PA (US) 15220

( * ) Notice: Subject to any disclaimer, the term of this patent is extended or adjusted under 35 U.S.C. 154(b) by 0 days.

(21) Appl. No.: 09/816,280

(22) Filed: Mar. 23, 2001

Related U.S. Application Data

(60) Provisional application No. 60/195,757, filed on Apr. 8, 2000.

(51) Int. Cl.[7] ............................................... G06F 12/00
(52) U.S. Cl. ........................ 711/170; 711/171; 711/147; 711/152
(58) Field of Search .............................. 711/147, 152, 711/171, 170; 709/102

(56) References Cited

U.S. PATENT DOCUMENTS

| | | | | |
|---|---|---|---|---|
| 5,109,336 A | * | 4/1992 | Guenther et al. ............ | 711/147 |
| 5,339,411 A | * | 8/1994 | Heaton, Jr. .................. | 711/171 |
| 5,442,758 A | * | 8/1995 | Slingwine et al. .......... | 711/147 |
| 5,561,786 A | * | 10/1996 | Morse ......................... | 711/170 |
| 5,623,654 A | * | 4/1997 | Peterman .................... | 707/206 |
| 5,784,698 A | * | 7/1998 | Brady et al. ................ | 711/170 |
| 5,784,699 A | * | 7/1998 | McMahon et al. .......... | 711/170 |
| 5,809,554 A | * | 9/1998 | Benayon et al. ............ | 711/170 |
| 5,864,867 A | * | 1/1999 | Krusche et al. ............. | 711/171 |
| 5,908,470 A | * | 6/1999 | Stonecypher, Jr. .......... | 713/502 |
| 5,930,829 A | * | 7/1999 | Little ......................... | 711/170 |
| 5,950,231 A | * | 9/1999 | Nichol ........................ | 711/170 |
| 5,978,893 A | * | 11/1999 | Bakshi et al. ............... | 711/147 |
| 6,058,460 A | * | 5/2000 | Nakhimovsky ............. | 711/152 |
| 6,070,202 A | * | 5/2000 | Minkoff et al. ............. | 711/171 |
| 6,108,757 A | * | 8/2000 | Arshad ....................... | 711/147 |
| 6,112,222 A | * | 8/2000 | Govindaraju et al. ....... | 709/102 |

OTHER PUBLICATIONS

Der–Ake Larson and Murali Krishnan "Memory Allocation for Long–Running Server Application" ISSM'98 10/98 Vancouver B.C. ACM 1–58113–114–3198.
Emery D. Berger S Robert D. Blumofe Wilson, McKinley "Hoard: A Scalable Memory Allocator for Multitheaded Applications" ASPLOS 2000 Cambridge, MA; ACM 0–89791–88–6197105.
Voon–Yee Vee F. Wen–Jing HSU A Scalable and Efficient Storage Allocator on Shared–Memory Multiprocessor I–Span'99, pp. 230–235, Frementle, Western Australia, Jun. 1999.
Arun Iyengar "Scalability of Dynamic Storage Allocation Algotithms" Sixth IEEE Symposium on the Frontiers of Puralal Computation p 223–232.
Wilson, Johnstone Neely Boles "Synamic Storage Allocation: A Survey and Critical Review" 1995 Int'l Workshop on Memory Management, Springer–Verlag.
Boehm, Hans "Fast Multiprocessor Memory Allocation and Garbage Collection" HPL–2000–165 20001221, www.hpl.hp.com//techreports/2000.
Xanalys "The Memory Management Reference Full. Bibliography" www.xanalys.com/software–tools/mm/bib/f.html.

* cited by examiner

Primary Examiner—Do Hyun Yoo
Assistant Examiner—Yamir Encarnacion

(57) ABSTRACT

Memory allocator combines private (per thread) sets of fixed-size free blocks lists, a global, common for all threads, set of fixed-sized free block lists, and a general-purpose external coalescing allocator. Blocks of size bigger than the maximal fixed size are managed directly by the external allocator. The lengths of fixed-size lists are changed dynamically in accordance with the allocation and disallocation workload. A service thread performs updates of all the lists and collects memory associated with terminated user threads. A mutex-free serialization method, utilizing thread suspension, is used in the process.

13 Claims, 8 Drawing Sheets

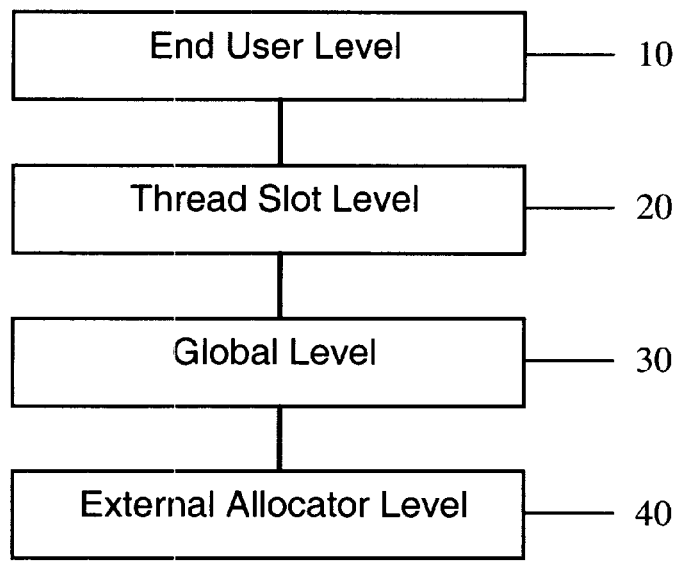
Fig. 1A – Memory Allocator Logical Levels
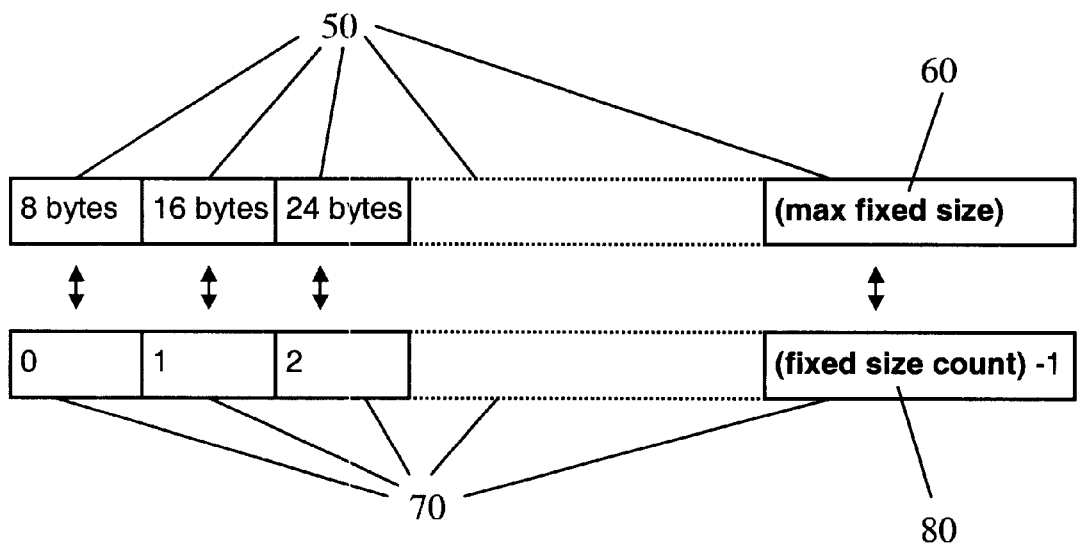
Fig. 1B – Fixed Block Sizes and Indexes

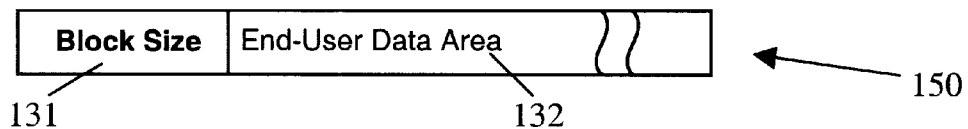
Fig. 2A – Memory Block Layout
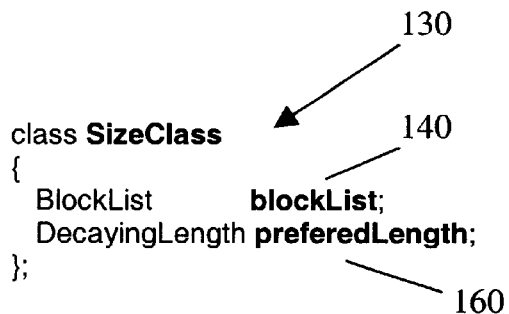
Fig. 2B – Size Class
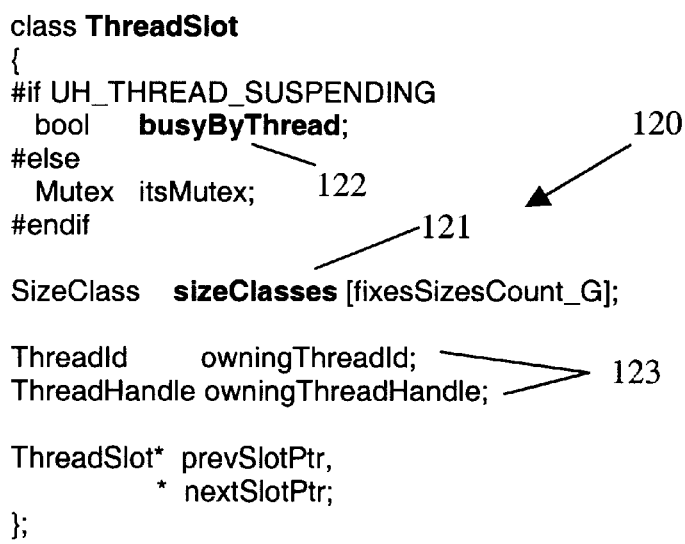
Fig. 2C – Thread Slot

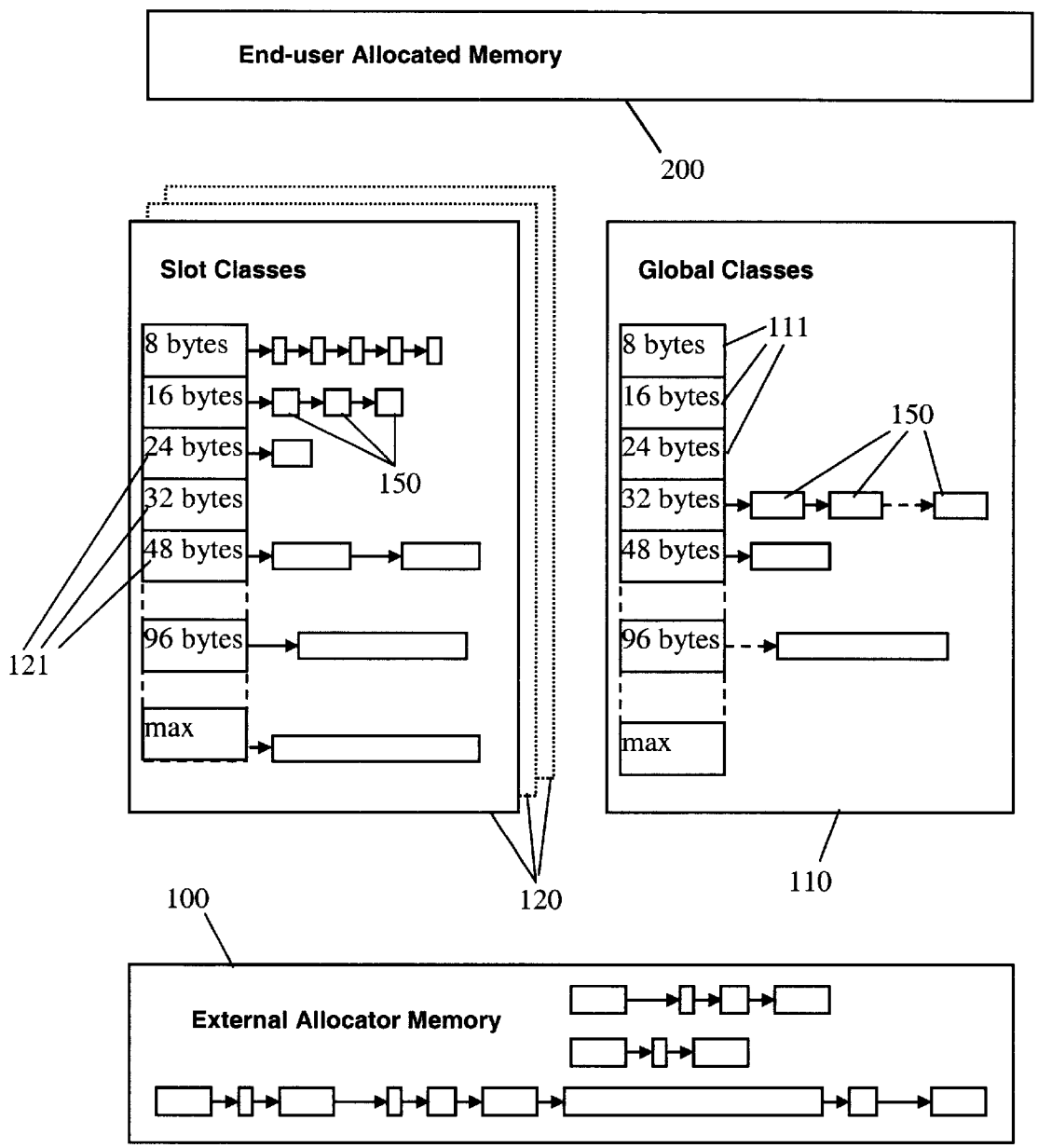
Fig. 3 – Memory Blocks Snapshot

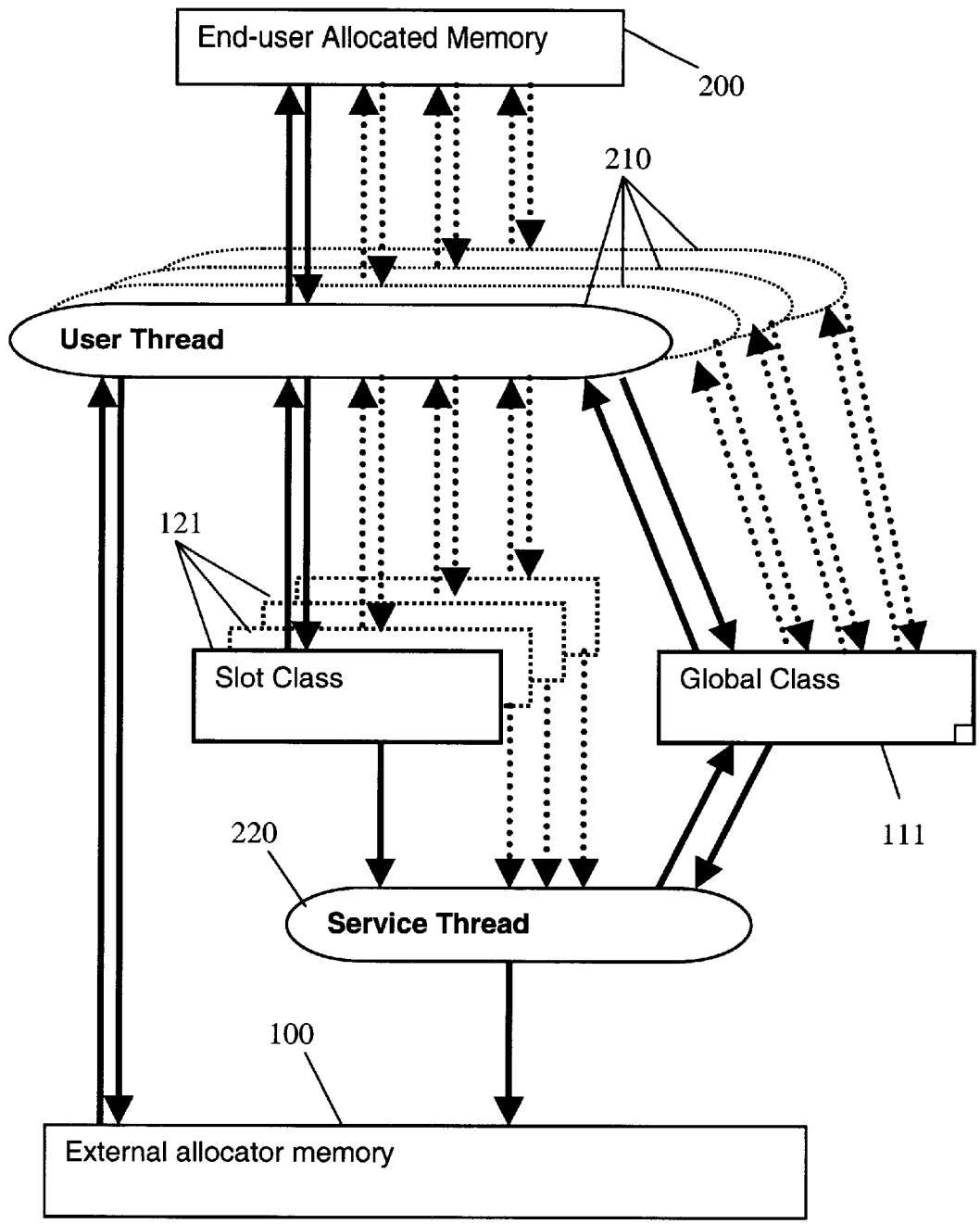
Fig 4 – Transfers of Free Blocks

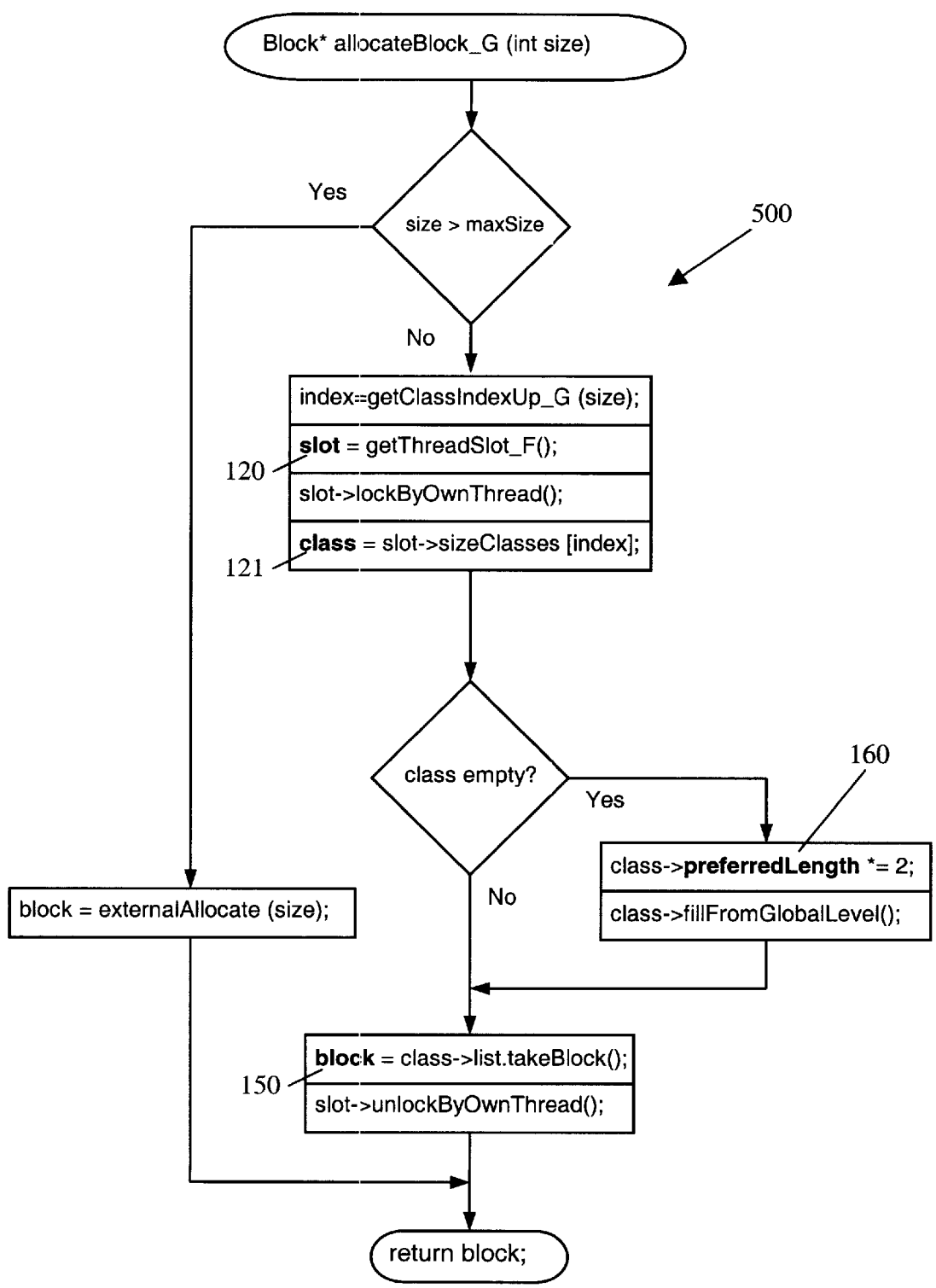
Fig 5 – Block Allocation

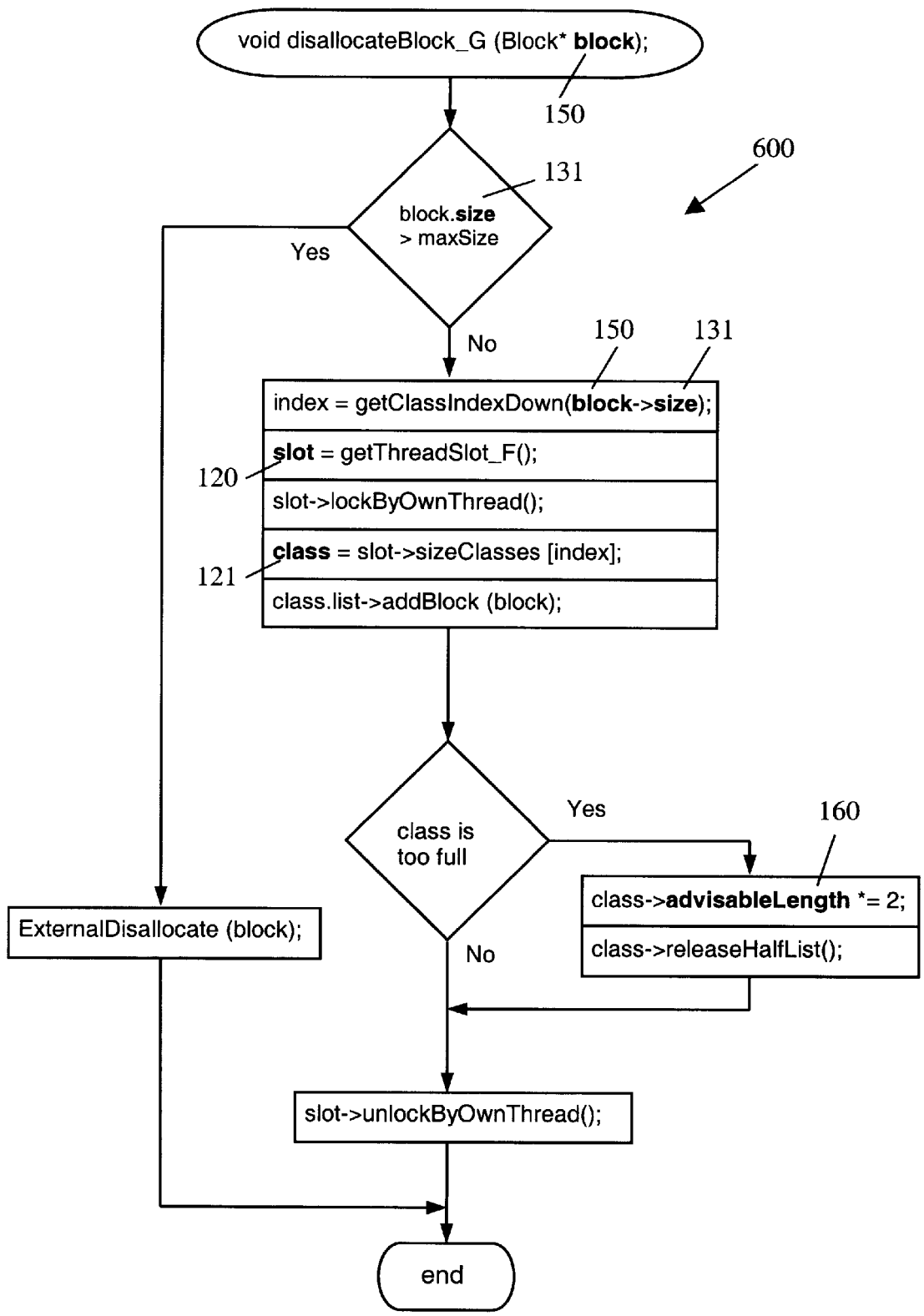
Fig. 6 - Block Disallocation

| CPUs | Threads | Clib | Hoard | Mutex | No Service | No Mutex |
|---|---|---|---|---|---|---|
| 1 | 1 | 488 | 446 | 997 | 1,266 | 1,294 |
| | 2 | 461 | 447 | 982 | 1,246 | 1,271 |
| | 4 | 445 | 444 | 976 | 1,235 | 1,256 |
| | 8 | 419 | 445 | 969 | 1,225 | 1,244 |
| | 16 | 400 | 445 | 963 | 1,216 | 1,237 |
| 2 | 1 | 437 | 450 | 977 | 1,243 | 1,267 |
| | 2 | 53 | 691 | 1,936 | 2,084 | 2,500 |
| | 4 | 52 | 879 | 1,858 | 1,993 | 2,369 |
| | 8 | 50 | 875 | 1,837 | 1,939 | 2,323 |
| | 16 | 49 | 855 | 1,805 | 1,876 | 2,270 |
| 4 | 1 | 399 | 449 | 968 | 1,204 | 1,247 |
| | 2 | 53 | 721 | 1,924 | 2,053 | 2,471 |
| | 4 | 48 | 879 | 3,478 | 1,444 | 4,342 |
| | 8 | 48 | 1,445 | 3,466 | 1,531 | 4,382 |
| | 16 | 46 | 1,555 | 3,247 | 1,544 | 3,796 |

Fig. 8A – Larson Benchmark, K Heap Operations/s

| CPUs | Threads | CLib | Hoard | Mutex | No Service | No Mutex |
|---|---|---|---|---|---|---|
| 1 | 1 | 1,426 | 1,257 | 4,118 | 7,386 | 7,744 |
| | 2 | 1,484 | 1,360 | 3,880 | 6,788 | 7,379 |
| | 4 | 959 | 1,361 | 3,815 | 6,313 | 6,996 |
| | 8 | 155 | 1,399 | 3,872 | 6,425 | 7,144 |
| | 16 | 121 | 1,447 | 4,141 | 7,198 | 7,988 |
| 2 | 1 | 1,428 | 1,267 | 4,134 | 7,375 | 7,812 |
| | 2 | 130 | 2,646 | 7,689 | 5,947 | 14,508 |
| | 4 | 99 | 2,634 | 7,240 | 5,821 | 13,313 |
| | 8 | 97 | N/A | 7,629 | 5,825 | 14,524 |
| | 16 | 95 | 2,465 | 8,072 | 6,227 | 15,773 |
| 4 | 1 | 823 | 1,221 | 4,123 | 7,412 | 7,831 |
| | 2 | 135 | 2,550 | 7,729 | 6,127 | 14,501 |
| | 4 | 98 | 5,348 | 15,145 | 3,975 | 27,462 |
| | 8 | 91 | 1,705 | 15,601 | 3,951 | 26,800 |
| | 16 | 90 | 3,766 | 15,211 | 3,968 | 30,846 |

Fig. 8B – New/Delete Benchmark, K Heap Operations/s

MEMORY ALLOCATOR FOR MULTITHREAD ENVIRONMENT

CROSS-REFERENCE TO RELATED APPLICATIONS

This application is entitled to the benefit of Provisional Patent Application Ser. No. 60/195,757, filed Apr. 8, 2000.

REFERENCE TO MICROFICHE APPENDIX

The appendix contains 4308 lines of source code in C++ programming language.

BACKGROUND—Field of Invention

The invention relates to memory allocation in computer systems and more particularly to dynamic memory allocation in single-thread and parallel (multi-process/multi-thread) environments.

BACKGROUND—Discription of Prior Art

Today, most modern programming languages, including C and C++, allow the user to request memory blocks from the system memory at run-time and release these blocks back to the system memory when the program no longer needs them. This is known as dynamic memory allocation. The part of the programming environment that serves the dynamic memory allocation requests is known as heap manager or dynamic memory allocator. Typically such services are provided by the operating system, by the standard (compiler) run-time libraries, by third-party libraries, or by combination of the above.

The C programming language provides memory management capability with a set of library functions known as "memory allocation" routines. The most basic memory allocation function is called "malloc" which allocates a requested number of bytes and returns a pointer that is the starting address of the memory allocated. A function known as "free" returns the memory previously allocated by "malloc" back to the system so that it can be allocated again later for use by other routines. Another frequently used function is "realloc" which changes the size and possibly the address of an allocated memory block, while preserving its contents.

The requirements for dynamic memory allocators are these: high speed, low maximal response time, high memory utilization, scalability with CPU count, and threads count independence. A desirable feature is the simplicity of their usage, preferably in a form, equivalent to the de-facto standard C language memory allocation functions.

Many dynamic allocators for single-thread environments have been designed over the years. A representative survey on this work have been done by Wilson, Johnstone, Neely and Boles in their paper "Dynamic Storage Allocation: A Survey and Critical Review", 1995. This survey does not cover the aspects of memory allocation specific for multi-thread environments. On the other hand, almost every multithread allocator uses some form of underlying monolithic (single-thread) memory allocator in its implementation.

Prior Art—Fixed Size Free Block List Allocators

Some of the memory allocators, known in the prior art, use deferred free block coalescing and storing free blocks in segregated lists of blocks of the same fixed size. They define a plurality of predetermined fixed block sizes. Each block list contains free blocks of the same size—one of the predetermined fixed sizes. In the prior art terminology these lists are also known as "bins", "quick lists", "block queues", or "fast lists". In some variants blocks, bigger than a predetermined maximal block size, are managed by a separate method. Additional method is used for coalescing and splitting of blocks, when necessary.

Prior Art—Fixed Size Free Block List Allocators— Determination of the Fixed Size Index The operation of the allocators of the aforementioned type includes a step of determining of the fixed size, corresponding to certain block size. Depending on what kind of request is being served (allocation or disallocation), the fixed size to be found is either the smallest one that is not less than the requested size, or the greatest one that is not greater than the requested size.

There are several methods for determining such a size. Some methods include storing of the fixed sizes in an array in e.g. increasing order and searching the array, either sequentially, or by binary search, for the size, satisfying the search condition. For instance, the "Hoard" allocator version 2.0.5.1 by Emery Berger, uses sequential search.

These search methods require several steps, which take time. This time adds to the time of the allocation request.

An obvious way to speed up this search is using a table of size equal to the maximal fixed size, filling each entry in table with the fixed size, corresponding to the index of the entry, and obtaining the fixed size, corresponding to a block size, by just taking the value in the table at position equal to the block size. This method is very fast and typically takes only several CPU instructions. Obviously, the same techniques may be used for obtaining the index of a fixed size rather than the fixed size itself, if this is more appropriate.

A drawback of this method is that the table that is needed might be quite big, relative to the size of the CPU cache. Typical values are 5 Kbytes for the table, corresponding to a maximal fixed block size of 5 Kbytes, and 32 Kbytes for data cache in a CPU.

The relatively big table size is a reason for increased CPU cache miss ratio, which in turn is a reason for deteriorated performance of the memory allocation operations, using this techniques.

Another method for determining such a fixed size index is presented in U.S. Pat. No. 5,623,654, 1997, Peterman. It uses table of limited size (e.g. 1024) and storing the free blocks of size having the same residue by module the table size to the same entry in the table. This method still requires several steps for determination of the fixed size, corresponding to a block size.

Prior Art—Fixed Size Free Block List Allocators— Controlling the List Length The blocks, residing in any particular free block list, are unavailable for anything else except for allocating blocks of size equal or smaller than the fixed size for this list. It would be desirable that the count of the blocks in any given free list is big enough, so that most allocation requests are satisfied by taking blocks from it, rather than from the splitting/coalescing part of the allocator. On the other hand, this count should be small, so that the memory overhead is low. It would also be desirable that the aforementioned count changes dynamically in accordance with the current program workload; i.e. provided that there is sufficiently long period of no allocation/disallocation activity for the particular fixed size, the entire list should be purged to the coalescing level, this way making the memory available for allocation as blocks of other sizes, or to other programs.

U.S. Pat. No. 5,109,336, 1992, Guenther et al, discloses a method for continuously purging unused blocks from the free lists in order to improve the memory usage. The method disclosed, though, does not provide any correlation between the program workload and the counts of the blocks remaining in the free block lists.

In general, using of segregated fixed size block lists with deferred coalescing did not find wide support in the monolithic (single-thread) memory allocators in the prior art. Some of the reasons for this fact are the unsolved problems, mentioned above.

Prior Art—Multithreading

In parallel computing environment with shared memory, e.g. multithread programs, there are more than one threads of execution of programming instructions that run simultaneously. Although typically threads are scheduled to run concurrently on the available CPUs, from the end-user's point of view they appear to run in parallel. In multiprocessor systems this parallelism is real. Typically, each thread has a set of associated system resources (registers, stack, local thread data, etc.), accessible by this thread only. There are also resources, among which is the dynamically allocated memory, that are shared among the threads.

Prior Art—Access Serialization—Mutexes

In parallel environments, methods are needed to ensure that the threads coordinate their activities, so that one thread does not accidentally change the data (or other type of object) that another thread is working on. This is known as access serialization. Serialization is achieved by providing means that limit the number of threads that access the same object concurrently.

For purposes of serialization, traditionally the multithread programming environments use the notion of a "mutex" (an abbreviation for "mutual exclusive lock"). A mutex is an object that can be acquired by at most one thread at a time. The operation of acquiring of the mutex causes the calling thread to wait until it (the mutex) becomes available, and to only proceed farther after mutex's successful acquisition.

When certain shared object needs to be accessed exclusively by one thread at a time, the traditional approach is to use a mutex, associated with the object. The first thread to access the object acquires the associated mutex, accesses the object, and when done, releases the mutex. If, during this time, a second thread tries to access the object, it waits until the mutex is released by the first thread, and only after its successful acquisition proceeds farther with the access. This way, no two threads can be active on the shared object at a time.

Using mutexes is expensive (i.e. slow) for two reasons: a) the contention of multiple threads for the mutex, and b) the high cost of obtaining the mutex even if there is no contention for it.

One way to solve the problem with the high contention rate is to design the programs in such a way that exclusively a single "owning" thread accesses a particular object. This solution solves both the contention rate and the mutex accusation cost problems, mentioned above, because there is no need for serialization at all.

There are situations, though, in which it's not possible to establish truly private ownership of some particular object by any given thread. In these cases, even if one ("owning") thread accesses the object "almost" exclusively, some other ("alien") thread may still need to access it, even if quite occasionally. In such cases, no matter how infrequent the alien thread accesses the object, there is a need for serialization of the access to it.

In the prior art access to a shared the object was serialized by a mutex, no matter how asymmetrically (i.e. with different frequencies) different threads accessed particular shared object.

There are cases in which the time needed to acquire or release a mutex constitutes a significant part of, or even exceeds, the time needed for performing of the actual object access. This way, the mutex's acquisition and releasing becomes a performance bottleneck. In such situations, a serialization method, requiting no mutexes, would be of considerable benefit.

Prior Art—Memory Allocation for Multithread Environments

Methods for memory allocation and disallocation, which perform well in single-thread environment, are typically not adequate when used directly in multithread one. For instance, immediate coalescing of free blocks, which was found to be quite suitable for single-threaded environments, imposes using of a single common mutex for serialization of the access of all the threads to the memory allocator data structures. It causes considerable performance degradation for memory allocation intensive applications that are performed by several threads in parallel, due to the high contention rate on the common mutex.

Some methods for memory allocation, focused specifically on multithread environments, are disclosed in the academic literature and in several US patents. These techniques found place in various multithread environment memory allocators: a) using fixed sized blocks and deferred, or no coalescing; b) using of multiple pools of free memory, each mapped to preferably different "owning" thread; c) transferring several blocks between thread private pool and the common storage at a time at the cost of a single mutex acquisition.

In U.S. Pat. No. 6,058,460, 2000, Nakhimovsky discloses an allocator, using a predetermined amount of pools (blocks of continuos storage of predetermined size) for memory management. Mutexes are used to serialize the access to the pools in order to avoid conflicts in cases when either two threads are mapped to the same pool, or when a block, allocated by one thread, is disallocated by another.

The allocator described in this patent has several weak points. When two or more threads map to the same pool, there is contention for this pool, with all caused by it negative consequences. The probability this to happen grows when the threads count increases, because the amount of pools is predetermined and presumably small. To decrease this probability, more memory pools have to be established, this way deteriorating the memory utilization. But even if each thread is mapped to a separate pool, contention still exists in cases when a thread releases blocks allocated from another thread. A scenario of very low memory utilization is possible also: allocating of a single small block from a pool of size e.g. 64 Kbytes.

In "Memory Allocation for Long-Running Server Applications", ISSM 98, available on Internet at www.acm.org/pubs/citations/proceedings/plan/286860/p176-larson, Larson and Krishnan describe an allocator featuring multiple heaps. A heap controls a continues memory area (stripe) of a predetermined size. Each heap is organized as a set of segregated by size free block lists. The access to the individual lists is serialized using mutexes;

there are no other locks. The amount of heaps is predetermined (e.g. 10), and conceptually smaller than the amount of the threads. Each running thread is mapped in a pseudo-random way to one of the heaps.

The allocator disclosed by Larson and Krishnan suffers performance degradation in cases when two or more threads map to the same heap (which happens inevitably once the threads count exceeds the heaps count) due to contention for the respective heaps and lists. Another drawback of this allocator is its low memory utilization, caused by the fact that heaps manage predetermined and relatively big areas (stripes) of memory.

Another memory allocator for multithread environments is the Hoard allocator by E. Berger, 1999. It uses kind of fixed-sized free block lists, organized as "superblocks"—continuous blocks of storage of predetermined size. For each fixed size each thread has a private heap—a set of superblocks. The thread's private heap is used when allocating blocks by each thread. Each thread can release blocks, allocated by another thread, serializing the access to the corresponding private heap by using an associated with it mutex. The amount of blocks in a heap is limited to twice the predetermined "superblock" size. If as a result of a disallocation the maximal allowed per-heap memory size is exceeded, the emptiest superblock from the heap is transferred to the global heap.

The Hoard allocator has these drawbacks: in a case when a small block of size e.g. 1 byte is allocated from a "superblock" of size e.g. 8 Kbytes, the memory utilization is very low. Scenario yielding bad performance is possible: contention for private heaps occurs when threads disallocate blocks being allocated by another threads. The Hoard allocator uses a linear search for determination of the fixed size class corresponding to the requested block size, which requires up to the predetermined fixed sizes count steps upon each allocation.

In "A Scalable and Efficient Storage Allocator on Shared-Memory Multiprocessors", COMPSPAC'98. Vee and Hsu describe an allocator for blocks of one fixed size. It uses private (per thread) pools. Each pool consists of an active and backup lists. Each list can contain at maximum a predetermined amount of blocks. The backup list in a pool is used to store blocks only if the active list is full. If both lists are full at the end of a disallocation, one of them is transferred at the cost of a single operation and mutex acquisition to a global (for all threads) stack of full lists. If both lists in a pool are empty upon allocation, one of them is refilled at the cost of a single mutex acquisition from the global stack of full lists.

According to the algorithm, described in the cited paper, each pool will contain, on average, an amount of blocks equal to the aforementioned predetermined maximal amount of blocks in a list. Unless this amount is very small, this causes a relatively big memory overhead. On the other side, if the predetermined maximal list length were small, it would mean that there are more frequent refills and purges of private pool lists to/from the global stack of full lists. This can cause high contention rate for the global stack, which is serialized by a common mutex. Additionally, there is no block coalescing foreseen, which makes the potential memory overhead even higher, and makes the algorithm inapplicable as an universal dynamic memory allocator.

None of the allocators using fixed-sized free block lists (or equivalent constructs), known in the prior art, makes any attempt to keep the length of these lists at some kind of optimum, depending on the behavior of the end-user application, i.e. the allocation and disallocation frequencies. In some situations this is a reason for low memory utilization, while in others it is a reason for bad performance.

BRIEF SUMMARY OF THE INVENTION

The present invention is a method of efficiently managing working storage in multi-thread (parallel) environments by combining private (per thread) sets of fixed-size blocks lists and an external splitting and coalescing general-purpose allocator. A global, common for all threads set of free block lists, makes efficient transferring of free blocks from one thread to another.

Blocks of size greater than the maximal fixed size are managed directly by the external allocator.

The lengths of fixed-size lists are changed dynamically on per thread and per size class basis in accordance with the allocation and disallocation workload.

A service thread performs regular updates of all the lists and collects the memory associated with terminated user threads. Mutex-free serialization method utilizing thread suspension is used in the process.

Objects and Advantages

Several objects and advantages of the present invention are:

a) to reduce the amount of processor times required to allocate, disallocate and reallocate a block of memory in multithreaded and single-threaded environments;

b) to reduce the amount of total working memory required, particularly during periods of low workload;

c) to achieve performance scalability as the amount of available CPUs increases;

d) to eliminate performance degradation, caused by thread serialization issues, as the amount of user threads or CPUs increases;

e) to eliminate performance degradation and memory wastage in situations, in which one thread disallocates blocks that were allocated by another thread;

f) to reduce memory wastage as the amounts of CPUs and user threads increase;

g) to use simple and standard end-user interface.

BRIEF DESCRIPTION OF THE DRAWINGS

FIG. 1A shows the structure of the allocator as described in the preferred embodiment.

FIG. 1B shows the predetermined fixed block sizes, maximal fixed size, and fixed size indexes.

FIG. 2A shows the layout of a memory block.

FIG. 2B is a C++ definition of a size class.

FIG. 2C is C++ definition of a thread slot.

FIG. 3 is a snapshot of the allocateable memory and associations of memory blocks with the allocator data structures.

FIG. 4 shows the transfers of free blocks between the end-user, the external allocator, and the allocator's own data structures. It also shows the end-user threads and the service thread performing these transfers.

FIG. 5 is a block diagram of a block allocation.

FIG. 6 is a block diagram of a block disallocation.

FIGS. 8A and 8B are benchmark results of the invention implementation from the Appendix, compared with the results of some prior-art allocators.

Figure 7A:
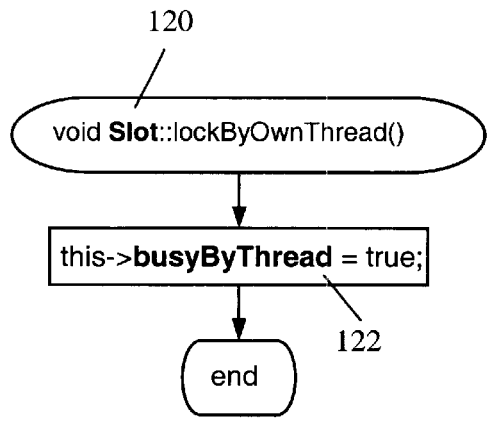
FIGS. 7A, 7B, 7C, and 7D are block diagrams of various parts of the mutex-free access serialization for thread slots.

Appendix contains the source code of an implementation of the preferred embodiment in C++ programming language. It consists of plurality of separate compilation units (source and header files).

REFERENCE NUMERALS IN DRAWINGS

- 10—end-user level
- 20—thread slot level
- 30—global level
- 40—external allocator level
- 50—fixed sizes
- 60—maximal fixed size
- 70—fixed size indexes
- 80—fixed size count
- 100—external allocator memory
- 111—global class
- 120—thread slot or slot
- 121—thread class
- 122—busy flag
- 123—thread identification and control data
- 130—size class
- 131—block size
- 132—user data area
- 140—free block list
- 150—memory block
- 160—preferred length
- 200—end-user allocated memory
- 210—user thread
- 220—service thread
- 500—block allocation
- 600—block disallocation

DESCRIPTION OF THE PREFERED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file of records, but otherwise reserves all copyright rights whatsoever.

Appendix—Main Embodiment Implementation Source Code

The preferred embodiment of the invention is best illustrated in the Appendix. The Appendix contains C++ source code of a fully functioning prototype implementation of the main embodiment of the invention, as well as of several alternative ones. The source code consists of separate compilation units (".h " and "cpp" files); the beginning and the end of each file is indicated by comments in the code.

The source code can be build using the Visual C++ Compiler Version 6.0, a product of Microsoft Corporation, Redmond, Wash. The operating environment is one of the operating systems Microsoft Windows 95/98/NT/2000, all products of Microsoft Corporation, Redmond, Wash.

In order to build the source code, all the source files (the ones with extension ".cpp") should be compiled and linked together. The header files (the ones with extension ".h") are needed at the moment of compilation. Multithread mode switch should be used for compilation, and the appropriate multithread mode run-time libraries shipped with the compiler should be used for linking.

The binaries, produced by successful compilation of the source code, are intended to be linked to an end-user code that calls the end-user memory allocation routines. These end-user routines are:

```
namespace ultraheap
{
void* userAllocate_G (int block_size); //memory block allocation
void userDisallocate_G (void* block); //memory block disallocation void* userReallocate_G (void* block, int new_Size); //memory block reallocation
}
void* operator new (size_t size); //standard C++ operator new( )
void operator delete (void* user_block); //standard C++ operator delete( )
```

The aforementioned end-user routines (except the standard C++ operators new and delete) are also declared in the header file User.h from the Appendix.

Overall Structure—Description

FIG. 1A shows the logical levels the allocator consists of. They are an end-user level 10, a thread-slot level 20, a global level 30, and an external allocator level or external allocator 40.

Referring to FIG. 1B, the invention uses a plurality of predefined fixed sizes 50. If these sizes are ordered in incrementing order, as shown on FIG. 1B, the successive index (zero based), corresponding to a particular fixed size 50, uniquely identifies it. This index will be referred to as a fixed size index 70.

The count of all the fixed sizes will later be referred to as a fixed sizes count 80. Among fixed sizes 50 there is a maximal fixed size 60.

The values of fixed sizes 50 are approximately exponentially distributed. That is, each fixed size 50 is approximately equal to the previous fixed size 50 multiplied by one and the same factor. Preferably this factor is about 1.2. Additional limitations, like platform-specific alignment restrictions, may also be taken into consideration when determining the exact values of fixed sizes 50.

In the Appendix, files SizeClass.h and SizeClass.cpp contain the code related to fixed sizes 50. The aforementioned factor has the value of 1.2 (#define UH_CLASS_SIZE_RATIO, file Config.h). Fixed sizes 50 are stored in the global array fixedSizes_G (file FixedSizes.cpp). The value of maximal fixed size 60 is stored in the global variable the maxFixedSize_G (FixedSizes.cpp). Fixed sizes count 80 is stored in the variable fixesSizesCount_G (file FixedSizesCount.cpp).

FIG. 2A shows the layout of a memory block or block 150. Each block 150 occupies continues storage. This storage is divided to a block size 131 of a predetermined size, and an user data area 132 of variable size, depending on the actual size of the particular block 150. Block size 131 contains the overall size in bytes of its containing block 150. In the Appendix, block 150 corresponds to the struct Block defined in file BlockList.h.

FIG. 2B shows the data structure of a size class or class 130, using as representation C++ notation. Each size class 130 comprises a free block list 140 and a preferred length 160. Block list 140 is capable of storing substantially arbitrary amount of blocks 150. The corresponding to size class 130 definition from the Appendix is class SizeClass in file SizeClass.h.

FIG. 2C shows the data structure of a thread slot or slot 120, using for representation C++ language notation. A slot class 121 is an instance of size class 130. Slot 120 comprises slot classes 121 of the amount equal to fixed size count 80. Different slot classes 121 within slot 120 correspond to different fixed sizes 50, respectively fixed size indexes 70, and vice versa. Farther, slot 120 comprises a busy flag 122 and thread control and identification data 123. In the Appendix slot 120 corresponds to class ThreadSlot in file ThreadSlot.h.

FIG. 3 shows a snapshot of allocateable memory at any moment of time and associations of blocks 150 with the different parts of slot level 20, global level 30, and end-user level 10.

Referring to FIG. 3, there is an external allocator memory 100. It contains free blocks of various sizes and unspecified organization.

Referring farther to FIG. 3, a global class 111 is an instance of size class 130. A global level memory 110 contains global classes 111 of the amount equal to fixed size count 80. Each global class 111 corresponds to unique fixed size 50. Farther, each global class 111 contains a mutex (not shown in the drawings; implemented in LockableSizeClass, file SizeClass.h in the Appendix). The corresponding to global classes 111 data from the Appendix is globalSizeClasses$_{13}$ F in file GlobalLevel.cpp.

Referring farther to FIG. 3, there is a plurality of slots 120. All slots 120 are registered in a global list of slots (not shown in the drawings; threadSlotListHead__F in file ThreadSlotsManager.cpp from the Appendix).

Overall Structure—Operation—FIG. 4

FIG. 4 shows by arrows the way blocks 150 are transferred between the different logical levels of the allocator (10, 20, 30, 40) as well as between the various structures of the allocator.

Referring to FIG. 4, in parallel (e.g. multi-process/multithreaded) environment with shared memory, a plurality of user threads 210 run simultaneously at any given moment of time. Some user threads 210 issue requests for allocating blocks 150 of various sizes. Some user threads 210 issue requests for dislocating blocks 150 previously allocated by the either the same or by some other user thread 210. There might also be reallocation requests: the reallocation being defined as disallocating of supplied as argument block 150 and returning block of potentially different size, but containing the same data in its user data area 131, as did the supplied block.

The allocator, which is the object of the present invention, serves these end-user dynamic memory allocation and disallocation requests by calling a block allocation 500 (shown on FIG. 5; discussed later) and respectively a block disallocation 600 (shown on FIG. 6; discussed later).

Referring to FIG. 4, during block allocation 500 and block disallocation 600, blocks 150 of size greater than maximal fixed size 60 are always transferred directly between end-user allocated memory 200 and external allocator memory 100 (routes 100-210-200 and 200-210-100, respectively). Therefore, the rest of the discussion in this section of the specification concerns transfers of blocks 150 of size smaller than or equal to maximal fixed size 60.

Referring back to FIG. 4, one slot 120 is established and associated with each user thread 210 that performs memory allocation or disallocation. In the implementation in the Appendix this establishment takes place upon the first memory allocation or disallocation operation performed by the particular user thread 210. Upon creating each slot 120 is registered in a global slot list (not shown in drawings; threadSlotListHead__F in ThreadSlotsManager.cpp from the Appendix).

Referring to FIG. 4, during block allocation 500, a free block 150 is transferred from slot class 121 to end-user allocated memory 200. On FIG. 4 this corresponds to the route 121-210-200. As part of this allocation procedure, if a free block 150 is not available in slot class 121, slot class 121 is refilled from the corresponding (of the same fixed size 50) global class 111. On FIG. 4 this is the route 111-210-121. As part of this refill procedure, if corresponding global class 111 is empty, it latter is refilled by taking some blocks 150 from external allocator memory 100, using external allocator 40; this is route 100-210-111.

Referring to FIG. 4, during block disallocation 600, a free block 150 is transferred from end-user allocated memory 200 via user thread 210 to slot class 121 (route 200-210-121 on FIG. 4). If as a result slot class 121 becomes too full (the measure for this is explained farther), some free blocks 150 from it are transferred to the corresponding (of the same fixed size 50) global class 111; this is route 121-210-111 on FIG. 4. If as a result of this transfer global class 111 itself becomes too full, some blocks 150 from it are transferred through external allocator 40 to external allocator memory 100 (route 111-210-100 on FIG. 4).

As shown on FIG. 4, a service thread 220 is running. In the implementation in the Appendix the service thread 220 is established upon the first end-user memory allocation request, from within block allocation 500. Service thread 220 makes regular updates of all slot classes 121 in all existing slots 120 and of global classes 111. An update of slot class 121 transfers some free blocks 150 to the corresponding (of the same fixed size 50) global class 111; on FIG. 4 it is the route 121-220-111. Similarly, an update of global class 111 transfers some blocks 150 from it to external allocator memory 100; this is the route 111-220-100 on FIG. 4.

Block Allocation—FIG. 5

FIG. 5 is a block diagram of the procedure of block allocation 500. It takes as argument a requested block size, and returns an allocated block 150 of this size. It comprises the steps of:

a) checking whether the requested block size is greater than maximal fixed size 60. If so, calling the external allocator's block allocating procedure (not shown) to allocate a block and terminating;

b) identifying fixed size index 70, corresponding to the requested block size;

c) identifying slot 120 associated with the calling user thread 210; if such one does not exist yet, creating new slot 120 and associating it with the calling user thread 210;

d) locking the identified slot 120 so that it is not accessible by any other thread;

e) in identified slot 120, identifying slot class 121, corresponding to identified fixed size index 70;

f) if identified slot class 121 is empty, incrementing its preferred length 140, and filling it up by transferring blocks from the corresponding (of the same fixed size 70) global class 111;

g) taking one block 150 from list 140 of the identified slot class 121;

h) unlocking identified slot 120 so that it is again accessible by the other threads;

i) returning of the block.

Additional details about the implementation of the memory allocation procedure can be found in the corresponding function slotAllocateUser__G, file ThreadSlot.cpp from the Appendix.

Block Disallocation—FIG. 6

FIG. 6 is a block diagram of block disallocation 600. The procedure takes as an argument block 150 to be disallocated. It comprises the steps of:

a) determining if passed block's 150 block size 131 is greater than maximal fixed size 60. If so, passing block 150 for disallocation directly to external allocator 40 and terminating;

b) identifying the fixed size index 70, corresponding to the value stored in block size 131 of the passed block;

j) identifying the slot, associated with the calling user thread 210; if such slot does not exist yet, creating a new slot and associating it with calling user thread 210;

c) locking identified slot 120 so that it is not accessible by any other thread;

d) in identified slot 120, identifying slot class 121, corresponding to the earlier identified fixed size index 70;

e) adding the block being disallocated to identified slot class 121;

f) if as a result of this identified class 121 becomes too full, incrementing its preferred length 160, and optionally transferring part of blocks 150 from its list 140 to the corresponding (for the same fixed size index 70) global slot 111;

g) unlocking identified slot 120 so that it is accessible by other threads. Additional details about block disallocation 600 can be found in the corresponding function slotDisallocateUser_G, file ThreadSlot.cpp from the Appendix.

Block Reallocation

A block reallocation procedure (not shown on drawings; corresponding to userReallocate_G, file User.cpp from the Appendix) takes as arguments an allocated block 150 and a request size. The block reallocation comprises the following steps: if both old block's 150 block size 131 and the request size both correspond to one and the same fixed size 50, returning old block 150. Otherwise, allocating new block 150, using block allocation 500; copying the contents of user data area 132 from the old block to the user data area of the new block 150, and; disallocating old block 150, using block disallocation 600.

Determination of Fixed Size Index 70

One of the steps of block allocation 500 is the determination of fixed size 50, respectively fixed size index 70, corresponding to a requested arbitrary block size. This fixed size 50 is the smallest one not smaller than the requested arbitrary block size.

Similarly, one of the steps of block disallocation 600 is the determination of fixed size 50, respectively fixed size index 70, corresponding to the value of block size 131 of the block being disallocated. In this case this is the greatest fixed size 50 not greater than the block's size.

One way to efficiently obtain such index 70 is using of a lookup table ("array" in programming languages like C, Pascal, etc). The invention's implementation in the Appendix uses a method that requires an array of significantly smaller size than the obvious implementations, used in the prior art. Following is a description of this aspect of the invention. The names used in the description correspond directly to the C++ language identifiers from the Appendix.

Referring to the Appendix, the method for determining of fixed size index 70, corresponding to a request size, comprises of the following:

a) choosing fixed sizes 50 in such a way that they are all multiple of a predefined integer number UH_SIZE_ALLIGNMENT. This number is preferably a power of 2 (e.g. 2, 4, 8, 16, etc). In the Appendix, UH_SIZE_ALLIGNMENT (defined in file Config.h) has value 8;

b) defining an array fixedSizeIndexes_G of size equal to fixed size count 80 (UH_MAX_BLOCK_SIZE in the Appendix) divided by UH_SIZE_ALLIGNMENT. Each entry of the array should be able to accommodate a non-negative integer numeric value not exceeding fixed size count 80;

c) initializing the array fixedSizeIndexes_G in such a way that at each position (i.e. a zero-based index) it contains the minimal fixed size index 70 such that corresponding to it fixed size 50 is not less than the position multiplied by UH_MAX_BLOCK_SIZE.

This initialization might be done either at run or at compile time. Although this is not the case in the Appendix, preferably a compile time initialization should be used: once initialized, the contents of fixedSizeIndexes_G do not change. If so, fixedSizeIndexes_G can be made a C++ "const" object. This may improve the compiler optimization opportunities and thus farther improve the overall performance.

The code in the Appendix that performers (run-time) initialization of the aforementioned array is the function fillFixedSizeIndexes_F in file FixedSizes.cpp.

d) defining the function getFixedSizeIndexUp_G, taking as an argument request_size, which finds the fixed size index 70, corresponding to request_size, in the following way:

int getFixedSizeIndexUp_G (int request_size)
{
int position=(request_Size+(UH_SIZE_ALLIGNMENT−1))/UH_SIZE_ALLIGNMENT,
ret=fixedSizeIndexes_G [position];
return ret;
} e) defining the function getFixedSizeIndexDown_G, taking as an argument block size, which finds the fixed size index 70, corresponding to block_size, in the following way:

int getFixedSizeIndexDown_G (int block_size)
{
int position=block_size/UH_SIZE_ALLIGNMENT+1,
ret=fixedSizeIndexes_G [position]−1;
return ret;
}

Definitions of the functions described in steps (d) and (e) exist under the same names in the Appendix in file FixedSizes.cpp.

As shown above, the programming code used to find fixed size index 70 corresponding to a request size, respectively a block size, is quite simple and fast. The size of the array needed thereby is UH_SIZE_ALLIGNMENT times smaller than the one used in simple indexing method, known in the prior art. For the default configuration in the implementation in the Appendix this size evaluates to about 3000/8~375 bytes. An array of such size resides in the CPU cache with much greater probability than an array of size 3000 bytes. Using one and the same array in step (d) and step (e) is another advantag.

The reason why it is preferable that UH_SIZE_ALLIGNMENT is a power of 2 is that division by such a constant number can be replaced by right shift operation by either the compiler, or manually by using the operator ">>" in the C++ programming language. Division might be much slower (tens of times) than the shift operation. Most contemporary C/C++ compilers replace division with shift, if the divisor is a constant being power of 2. Otherwise, the UH_SIZE_ALLIGNMENT being power of 2 should not be considered a mandatory factor.

External Allocator 40

External allocator 40 of unspecified organization and implementation is expected to perform any necessary block coalescing and splitting, as well as allocating and returning memory from/to the external operating environment, when necessary. External allocator 40 is also used to manage directly blocks of size greater than maximal fixed size 60.

Thus, the concrete implementation of external allocator 40 is not part of the present invention. It can be implemented using any techniques used for implementation of monolithic (single-thread) allocator; there are a lot of possible techniques, known in the art. As far as the implementation in the Appendix is concerned, it is even not necessary that the external allocator is thread-safe; the calls to what is external allocator 40 in the Appendix are serialized using a single mutex.

Farther, external allocator 40 needn't be fast. For typical distributions of requested allocation sizes (that is, small blocks are allocated more frequently than large blocks) there are very few calls to external allocator 40, compared with the overall amount of memory allocation operations. So, even if the external allocator 40 is relatively slow, up to some reasonable limit, the effect of this on the overall performance will be negligible.

Referring to the Appendix, external allocator 40 is implemented in files ExternLevel.h and ExternLevel.cpp. In the implementation the standard C library functions malloc, free, and realloc are used as underlying basis. The invention implementation from the Appendix does not use any specific knowledge about how these functions are implemented. An alternative embodiment, though, as far as the aspect of the implementation of external allocator 40 is concerned, could share the usage of block size 131 (FIG. 2A) with the rest of the allocator.

Sharing block size 131 with external allocator 40 has these advantages:
a) the overall memory required by each block 150 could be reduced by simply reusing the same data;
b) bocks 150 of different sizes, not necessarily equal to some of fixed sizes 50, can be used. This means that external allocator 40 is allowed to return blocks 150 of size somewhat greater than requested. This relaxation might simplify its design and farther reduce the overall memory overhead.

Preferred Length 160

There are two mutually opposite considerations that are to be taken into account when determining the amount of free blocks 150 to be stored in a size class 130:
a) keeping too few blocks 150 in list 140 increases the frequency of allocations that cannot be served directly by its owning slot class 121, respectively global class 111, therefore requiring taking blocks from the lower allocator level(s) (global level 30 and external level 40, respectively). Taking/returning block 150 from/to a lower allocator level (as of FIG. 1A) is slower than doing int at the same level;
b) keeping too many blocks 150 in lists 140 makes these blocks unavailable for allocations from the other parts of the same program (i.e. by other user threads 210 or as blocks of other fixed size 50), or to other programs in the same environment. This increases the memory overhead.

The invention uses a method for keeping the aforementioned list 140 lengths to a minimum by dynamically changing them in accordance with the corresponding to each of them program workload, on per user thread 210 and per fixed size 50 basis. Following is a description of this aspect of the invention.

Each size class 130 contains preferred length 160 (FIG. 2B). Preferred length 160 is a numeric variable, used to store a value containing the estimated preferred amount of blocks 150 in block lists 140 of both global classes 111 and slot classes 121. The corresponding to preferred length 160 item from the source code in the Appendix is SizeClass::preferedLength, file SizeClass.h.

For each particular global class 111 and for each particular slot class 121 preferred length 160 changes individually and dynamically. The changes are accomplished in several ways:
a) all preferred lengths decay exponentially with the time, independently on everything else. Files DecayingLength.h and DecayingLength.cpp in the Appendix contain the implementation of this decaying.
b) preferred length 160 is incremented whenever during block allocation 500 the request cannot be served by the owning size class 130 itself, because its list 140 is empty;
c) preferred length 160 is incremented whenever adding of free block(s) 150 to any global class 111, respectively to any slot class 121, causes the size class to overflow; that is, to contain amount of blocks 150 more than twice the current value of its preferred length 160.

Various parts of the invention work toward keeping the actual lengths of lists 140 in global classes 111 and slot classes 121 close to their respective preferred lengths 160:
a) when global class 111, respectively slot class 121, is refilled from a lower allocator level, the amount of blocks 150 that are requested from the lower level is equal to its preferred length 160;
b) block disallocation 600 and class updates (discussed in detail later) transfer the superfluous free blocks 150 from global classes 111 and slot classes 121 to the corresponding lower allocator levels 30 and 40, this way making actual list 140 length closer to preferred length 160.

Slot Class 121 and Global Class 111 Updates

Periodically, each of slot classes 121 and global classes 111 is updated a class update or update. The updates are one of the means to keep the amount of blocks 150 in both slot classes 121 and global classes 111 near to their respective preferred lengths 160.

Updating of slot class 121 transfers excessive free blocks 150 from its list 140 to the corresponding (of the same fixed size 50) global class 111. More specifically, an update of a particular slot class 121 instance comprises the steps of:
a) locking its owning slot 120 so that it is not accessible by other threads;
b) determining the actual length of (i.e. the amount of the blocks in) its list 140;
c) if the actual length is greater than twice the slot class's 121 preferred length 160, transferring half of the blocks 150 from the slot class 121 to the corresponding (of the same fixed size 50) global class 111.
d) optionally repeating steps b), c), and d) for some more or for all of the contained slot classes 121 in the owning slot 120;
e) unlocking the owning slot 120 so that it is accessible by other threads.

Similarly, updating of global class 111 transfers superfluous free blocks from its list 140 via external allocator 40 to external allocator memory 100. More specifically, an update of particular global class 111 instance comprises the steps of:
a) locking the particular global class 111 so that it is not accessible by other threads;

b) determining the actual length of (the amount of the blocks in) its list 140;

c) if the actual length is greater than twice the list's 140 preferred length 160, transferring half of the blocks 150 from its list 140 via external allocator 40 to external allocator memory 100;

d) unlocking the particular global class 111 so that it is accessible by other threads.

Functions corresponding to the class updates, described above, exist in the implementation in the Appendix.

One of the effects of the class updates, together with the fact that preferred lengths 160 decay exponentially with the time, is the following: after sufficiently long periods of no allocation/disallocation activity for particular slot class 121, all blocks 150 from its list 140 are returned to the corresponding to it global class 111 and eventually to external allocator memory 100.

This way, class updates are part of the allocator's mechanism to dynamically tune itself to the frequencies of the end-user allocation and disallocation requests on per thread 210 and per fixed size 50 basis. As a result, class updates help minimizing the memory usage during periods of low allocation activity, and maximizing the performance during periods of high allocation or disallocation activity.

Service Thread 220

In the implementation from the Appendix, service thread 220 is created upon the allocator data structures initialization. It runs in parallel with user threads 210. The main task of service thread 220 is to perform the aforementioned periodic class updates. The corresponding code in the Appendix is the function serviceThreadFunction_F in file User.cpp.

Performing updates by a separate thread ensures regularity of the updating of all the global classes 111 and slot classes 121. Compared with an alternative embodiment, in which the update procedure is performed inside block allocation 500 or block disallocation 600 (or both), this approach has the advantage that it does not depend on whether there are end-user allocation or disallocation calls at all.

This solution also saves the additional time, associated with the updating, that would otherwise be added to the time of block allocation 500 and block disallocation 600.

In the preferred embodiment service thread 220 does its job in incremental manner, updating just a few of the classes (global classes 111 and slot classes 121) at a time. This helps avoiding occasional long delays in block allocation 500 and block disallocation 600, Lastly, service thread 220 is also used to release slots 120, associated with terminated (or "joined") user threads 210.

Global Classes 111 Motivation

In some alternative embodiments, global level 30 and the logically belonging to it global classes 111 do not exist. It these alternative embodiments, the transfers of blocks 150 happen directly between slot classes 121 and external allocator 40, respectively external memory 100 (FIG. 4).

There are reasons for the existence of global slots 111 in the preferred embodiment, though. There is a well known problematic scenario for allocators in multithread environments, and namely allocating blocks from one thread and are disallocatiing them by another. This scenario causes unbounded memory consumption by the allocators, using pure private heaps. In other cases it causes high contention rate and deteriorated performance.

The presence of global level 30 and transferring a plurality of blocks 150 between slot class 121 and global class 111 at a time help maximizing the allocator's performance in scenarios similar to the one described above. Transferring a plurality of blocks at a time also amortizes the cost of global class's 111 and slot's 120 locking (i.e. access serialization) during these transfers.

Mutex-Free Serialization (FIGS. 7A, 7B, 7C, 7D)

The serialization of the access to thread slot 120 between the associated with it user thread 210 on one side, and service thread 220 on another, uses a mutex-free serialization method. The method comprises the following steps:

a) establishing thread identification and control data 123 (FIG. 2C) in slot 120. This identification data should be sufficient for an "alien" thread (as opposite to the "owning" user thread 210, i.e. the one associated with the slot) to be able to suspend (i.e. temporarily stop the execution of) and later resume slot's 120 owning user thread 210;

b) establishing a boolean busy flag 122 (FIG. 2C) in slot 120. It is essential that the actual type of busy flag 122 enables atomic write and read operations on it. Such kind of operation has the property that they are uninterruptible: i.e., it is not possible that, if a thread is preempted or awakened while modifying or reading the flag, it could leave, or respectively see it, in inconsistent state. For instance, the C language standard library defines "sig_atomic_t" to be such a data type.

c) performing access by user thread 210 to its associated slot 120, comprising the following steps:
i) setting slot's busy flag 122 to value true,
ii) performing the access to the slot's data (i.e. its slot classes 121),
iii) setting slot's busy flag 122 back to false.

Figure 7B:
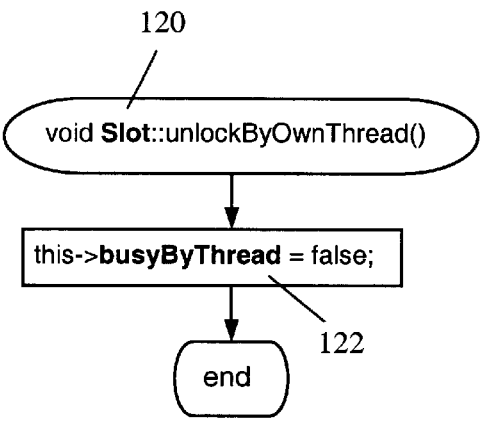

These steps are illustrated as block diagrams on FIG. 7A and FIG. 7B.

d) performing access by service thread 220 to any slot 120, comprising the following steps, all performed by the service thread:
i) identifying slot's 120 associated ("owning") user thread 210, using thread identification and control data 123 thereby;
ii) suspending identified user thread 210;
iii) checking slot's busy flag 122;
iv) accessing slot's 120 data (i.e. slot classes 121) only if busy flag 122 is false;
v) resuming the "owning" user thread 210.

Figure 7C:
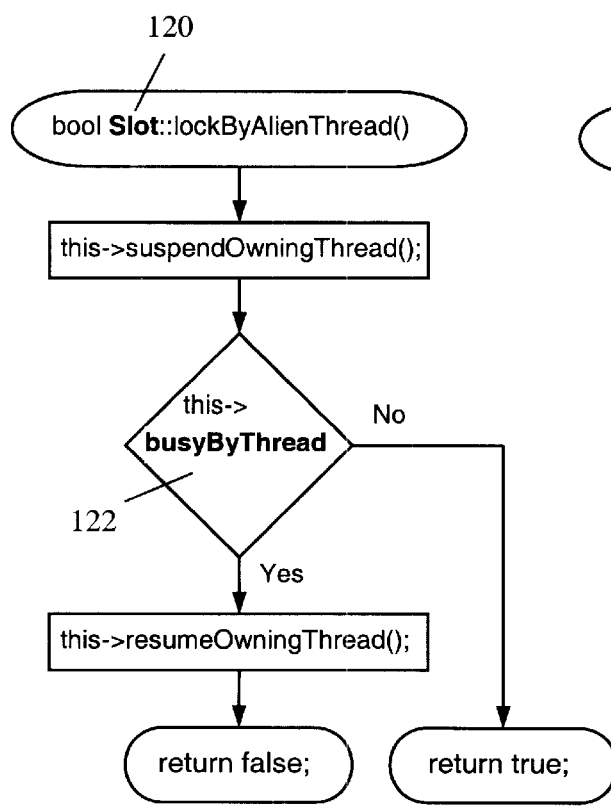
Figure 7D:
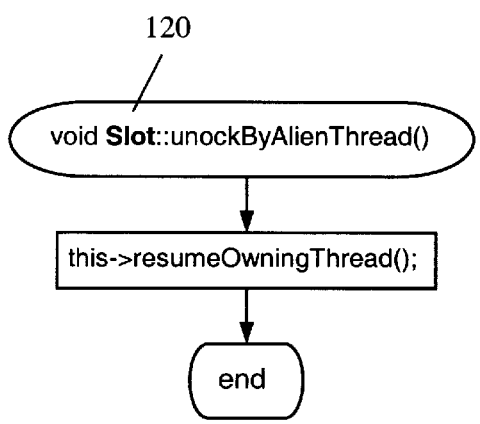

These steps are illustrated as block diagrams on FIG. 7C and FIG. 7D.

The accesses of service thread 220 and user thread 210 to slot 120 are serialized, because at any given time exactly one of the following three conditions holds:

a) no thread accesses the slot 120;

b) owning user thread 210 is in a process of accessing slot 120. In this case slot's busy flag 122 is true. If an attempt is made by the service thread 220 to access the slot at the same time, it will just suspend slot's owning user thread 210, check busy flag 122, and resume the owning user thread 210 without attempting to access slot 120.

c) service thread 220 is in a process of accessing slot 120. It can only happen if its busy flag 122 is false—which means that the owning thread 210 is suspended in a state of NOT accessing the slot 120. Therefore, service thread 220 is the one that exclusively accesses slot 120.

Busy flag 122 is set and read by simple "set", respectively "read" operations, and not the atomic "test and set" operations, which are typically required for achieving synchronization in multithread environments. A simple "set"

operation is typically much faster than the atomic "test and set" one. That means that the end user thread 210 runs, as far as serializing the access to slot 120 is concerned, with no performance degradation, implied by serialization, except for setting and resetting the simple boolean flag.

The implementation of the invention in the Appendix uses the described serialization method. The corresponding to it code can be found in the following routines: ThreadSlot:: lockByOwnThread, ThreadSlot::unlockByOwnThread, ThreadSlot::lockByAlienThread, ThreadSlot::unlockBy-AlienThread and ThreadSlot::isLocked; all defined in files ThreadSlot.h and ThreadSlot.cpp.

Alternative Embodiments

There are several aspects of the invention, mentioned in the description of the preferred embodiment, that can be optionally omitted, separately or in combination with other ones. Additionally, there are some more optional features that can be added. The combinations of the features present or omitted form a plurality of alternative embodiments.

In the Appendix, the presence or the absence of some particular features can be controlled in an easy way, thus turning it to alternative embodiment(s). This is done by the means of conditional compilation, using the C++ language preprocessor. There are several configuration flags, #defined in file Config.h, each controlling a particular feature. Generally, each configuration flag can be turned on and off or have its value changed independently from the other flags.

Following is the description of particular features of the invention that are optionally present in several alternative embodiments, together with the corresponding control flag from file Config.h in the Appendix, if such flag exists.

Single-Thread Mode Allocator

The invention can be used as an allocator for single-thread environment. To build the source code from the Appendix for single-thread mode, it is sufficient to select the appropriate single-thread mode compilation flags and linking it with the appropriate run-time libraries.

In single-thread mode the thread-related data structures and routines are not used. Such an embodiment still has an advantage over the prior art, and namely keeping global class 111 list 140 lengths at minimum, using preferred length 160 and the aforementioned class updates. In single-thread mode class updates in are done from within block allocation 500 and block disallocation 600.

Thread Level 20 and Thread Slots 120 Presence

Referring to the Appendix, file Config.h, if flag UH_GLOBAL_ONLY is #defined alternatively to 1, it causes eliminating of slot level 20 together with the associated data structures (slots 120, slot classes 121) and routines.

Global Level 30 and Global Classes 111 Presence

Another optional feature that can me omitted is global level 30 along with the respective data structures and routines. The main difference in such set of embodiments, compared to the preferred embodiment, is the absence of global classes 111. Thus, thread level 20 communicates directly with external allocator 40.

Service Thread 220 Presence

Referring to the Appendix, file Config.h, if flag UH_USE_SERVICE_THREAD is #defined alternatively to 0, service thread 220 is not established. In such a configuration, class updates and releasing of slots 120 associated with terminated user threads are performed by user threads 210 from within block allocation 500, block disallocation 600, or both.

Multiple Service Threads 220

In alternative set of embodiments, there might be a plurality of service threads 220. If multiple service threads 220 are present, they should coordinate their work, e.g. by distributing among themselves slots 120 to be updated. In a multiprocessor system this distribution preferably should be made in such a way that particular service thread 220 only updates these slots 120 that are associated with user threads 210 on the same CPU as the service thread itself. This improves the performance by decreasing the amount of synchronization events between the separate CPUs in the system.

Mutex-Free Versus Mutex Serialization

Referring farther to the Appendix, file Config.h, if flag UH_THREAD_SUSPENDING is #defined alternatively to 0, the mutex-free serialization method used for serialization of the access to slots 120 between its owning user thread 210 and service thread 220 is not used; rather than this, a serialization using classic mutex is used instead.

Sorting of Free Block Lists 140

In alternative set of embodiments, free lists 140 are being occasionally sorted by either increasing or decreasing order of blocks' 150 starting addresses (it is assumed that taking block 150 from list 140 always takes the first block from the list, as sorted). Sorting of lists 140 might improve the locality of the memory references, this way improving performance by minimizing cache misses in both the end-user code and in the allocator routines.

Sorting is just a means of taking from list 140 the block with substantially the minimal, respectively the maximal address. In another alternative embodiments, the same effect can be achieved in different ways: e.g. by keeping the lists ordered all the time, by searching, etc.

Referring to Appendix, Config.h, if flag UH_SORT_LISTS is #defined alternatively to 1, block lists 140 are occasionally being sorted. If UH_SORT_LISTS is #defined to 0, no sorting takes place.

Block Size 131

In the preferred embodiment, the size of blocks 150 is kept in block itself as block size 131 (FIG. 2B). From the specification it is evident that this size is only needed in block disallocation 600 for the purpose of finding corresponding to it fixed size 50, respectively fixed size index 70. Alternative ways to obtain this size and size index are possible, which do not require the presence of block size 131 in block 150 itself. One such way, for instance, is allocating of a page of continuous storage, designating this page for blocks 150 of equal size, and using pointer arithmetic to find the page, and hence the size of the block. This should be classified as additional functionality of external allocator 40. Removing block size 131 from block's 150 layout might improve memory utilization.

Keeping Fixed Size Index 70 in Allocated Blocks 150

In an alternative set of embodiments fixed size index 70 itself, rather than, or additionally to block size 131, is stored in blocks 150, at least while they are allocated by the end user. In such embodiments the procedure required to find the fixed size index 70 during block disallocation 600 (getFixedSizeIndexDown_G in the Appendix) is not needed, because the fixed size index 70 is stored readily in the block 150 to be disallocated. This may improve the performance of block disallocation 600 by eliminating this step.

Similarly to the case regarding block size 131, discussed in previous section, external allocator 40 might be made responsible to provide the service of determining fixed size index 70, given the address of particular block 150, e.g. by using pages of equally sized blocks 150 and pointer arithmetic. This way, it is possible to eliminate the presence of both block size 131 and fixed size index 70 from the layout of blocks 150.

List 140 Implementation Variations

In the Appendix, the organization of free list 140 uses a dynamically allocated array of pointers to blocks 150. It should be evident that a variety of alternative implementations of this list are possible. The most obvious would be to use linked lists of blocks 150, placing a link pointer in the otherwise unused user data area 132. This would save the memory needed for the dynamically allocated arrays. On the other hand, such an organization would not allow e.g. fast sorting of free lists.

Another implementation might use a preferably balanced, e.g. AVL or red-black binary tree of blocks 150, sorted in increasing or decreasing order by the block's starting address; the parent and children node pointers might be placed in the otherwise unused user data area 132.

List 140 Length Limitation

The implementation in the Appendix uses predetermined upper-bound limits for the count of blocks and the amount of memory that a lists 140 can contain at a time. The reason for this is to limit the maximal amount of memory being kept in the allocator data structures at any time in extreme workloads. In the Appendix, file Config.h, there are two flags controlling these limits: UH_MAX_LIST_MEMORY and UH_MAX_LIST_LENGTH. The particular values of these flags, as well as the presence or not of upper limits of lists' lengths at all, form additional set of embodiments.

Tracking All Events in Preferred Length 160

In alternative set of embodiments preferred length 160 is incremented by one at each block allocation 500 and decremented by one at each block disallocation 600. The flag UH_TRACK_EACH_EVENT (0 in the preferred embodiment) in file Config.h from the Appendix determines whether this happens or not.

Benchmarks—FIGS. 8A and 8B

The implementation from the Appendix was measured using two test suites (known also as "benchmarks" in the art). The results of these benchmarks are shown in tables on FIGS. 8A and 8B.

The benchmarks were performed with three different embodiments of the invention, as well as with a couple of other prior-art allocators. Different counts of available CPUs and different counts of running threads were used, all other things being equal, so that CPU scalability and threads count dependability could be measured.

Microsoft Visual C++ compiler, version 6.0, was used to build the benchmarks and the measured allocators. The benchmarks were run on a computer system equipped with four 500 MHz Pentium III CPUs under the operating system Microsoft Windows Server NT 4.0.

Referring to FIGS. 8A and 8B, the different columns in the tables are:

a) CPUs—the count of the permitted CPUs for the test;
b) Threads—the threads count for the test;
c) CLib—results for the allocator supplied with the compiler run-time library (Microsoft Visual C++ Version 6.0, mentioned earlier in the specification). This allocator is a monolithic (single-thread) allocator, using a single mutex for serialization;
d) Hoard—results for the Hoard allocator, version 2.0.5.1, mentioned in the discussion of the prior art;
e) Mutex—results for the main embodiment of the invention as implemented in the Appendix, except that it does not use the mutex-free serialization method (FIGS. 7A–7D);
f) No Service—results for the main embodiment of the invention as implemented in the Appendix, except that it does not use service thread 220;
g) No Mutex—results for the main embodiment "as implemented" in the Appendix.

The results are in thousands (K) of heap operations (block allocations and disallocations) per second.

New/Delete benchmark—FIG. 8A

This benchmark performs random allocations and disallocations of blocks of random sizes. 95% of allocated blocks have sizes randomly distributed in the range from 1 to 100 bytes, and 5% have sizes randomly distributed in the range 1–2000 bytes. Each thread performs the same amount of allocations and disallocations. Blocks, allocated by one thread, are always disallocated by the same thread. The time for the same benchmark performing no ops is extracted from the overall measured time, this way estimating the pure (net) time used by the allocations and disallocations only.

Larson Benchmark—FIG. 8B

This is a benchmark for testing multithread-specific memory allocators. It consists of random allocation and disallocation of blocks of sizes in range 10–1000 bytes. Each thread performs the same amount of allocations and disallocations. Some blocks are allocated by one thread and disallocated by another. The gross (i.e. allocation+ benchmark) time is measured and shown as result.

Conclusions, Ramifications, and Scope

As an overall result, the present invention reduces the amount of processor time, required to allocate, disallocate and reallocate a block of memory in both multithreaded and single-threaded environments; reduces the amount of total working memory required; self-tunes itself to the current workload; does not experience performance degradation or memory wastage as the amount of the threads and CPUs increases; scales well in multiprocessor systems as the amount of CPU increases; uses a simple and standard end-user interface.

Several possible ramifications of the present invention are:

a) using it for memory allocation in end-user programs in order to improve the performance everywhere when there is explicit memory allocation and disallocation involved, in single-thread, multi-thread, and multiprocessor environments with shared memory;
b) using it in the implementations of the run-time libraries for programming languages that use explicit dynamic memory allocation (e.g. C, C++, Pascal, etc);
c) using it in the implementation of other environments that offer services of dynamic memory allocation, such as operating systems or parts thereof;
d) using it in environments that do not perform explicit disallocation, but rather use a mechanism known as "garbage collection", for the aspects of managing the free memory and disallocating the blocks reclaimed by the garbage collector.

The mutex-free serialization method by itself can be used for serialization of the access of threads or processes in multithread environments to shared objects of any type.

Although the description of the invention contains many specificities, these should not be construed as limitations of the scope of the invention, but rather as an exemplification of several embodiments thereof. For instance, it should be acknowledged by the skilled in the art that although the implementation in the Appendix is somewhat specific for a particular operating environment, equivalent implementations for other environments (i.e. compilers, programming languages, operating systems, hardware platforms, etc) are easily achievable.

Accordingly, the scope of the invention should be determined not by embodiments illustrated, but by the appended claims and their legal equivalents.

I claim:

1. A method for managing of allocation of memory blocks in a computer system, said computer system:

(a) defining one or more threads, said one or more threads being the execution of sequence of programing instructions;

(b) running at least one of said threads in parallel;

(c) defining a fixed size, said fixed size being a positive integer number;

(d) providing a fixed size set, said fixed size set comprising at least one of said fixed size; said fixed size set being farther characterized by a maximal fixed size and a fixed sizes count;

(e) comprising a memory;

(f) providing an external allocation, said external allocation:
   i) by a request, the request including a block size, the block size being one of the members of said fixed size set, the request also including a blocks count,
   ii) performing allocation of memory blocks or blocks of that blocks count from said memory of said computer system, each block of that block size;

(g) providing an external disallocation, said external disallocation:
   i) by a request, the request including at least one block, previously been allocated by using of said external allocation,
   ii) performing disallocation of these blocks and returning them to said memory of said computer system;

said method for managing of allocation of memory blocks comprising the steps of:

(h) defining a class, said class:
   i) being capable of storing substantially arbitrary amount of blocks at a time;
   ii) providing means for adding to it and taking from it of an arbitrary amount of blocks at a time;
   iii) providing means for querying the length thereof, length being the count of the blocks therein;
   iv) comprising a preferred length, said preferred length being a variable, capable of storing a non-negative numeric value;

(i) defining a class set, said class set containing said classes of amount being equal to said fixed sizes count;

(j) establishing a correspondence between said fixed sizes from said fixed size set and said classes from said class set; the correspondence being such that each member of said fixed size set corresponds to exactly one member of said class set and vice versa; the correspondence being sufficient to identify the class in given instance of said class set, given said fixed size;

(k) defining a slot, said slot comprising an instance of said class set;

(l) providing an associating means; said associating means performing association between an instance of said slot with exactly one of said threads, the association being mutual, one to one; said associating means being sufficient to identify said slot instance, associated with particular of said threads;

(m) establishing a separate instance of said slot for each of said threads, running on said computer system, thereby associating said slot instance with the particular said threads and vice versa, using said associating means;

(n) providing a means for decaying of preferred lengths, said means for decaying of preferred lengths performing decaying of the current values of said preferred length of all said classes in existence; the decaying being non-negatively correlated with the passing of time, the time being an adequate measure for the temporal relationships on said computer system;

(o) providing a means for preferred length incrementing; said means for preferred length incrementing referring to a particular instance of said class; said means for preferred length incrementing performing modifying of the current value of said preferred length of the particular instance of said class; said means for preferred length incrementing comprising a sequence of operations, selected from the group consisting of:
   (1) doing nothing;
   (2) if the current value is less than one, setting it to a predetermined positive number; otherwise firstly incrementing it by a predetermined non-negative number and then multiplying it by a predetermined positive number;
   (3) if the current value is less than one, setting it to a predetermined positive number; otherwise firstly multiplying it by a predetermined positive number and then incrementing it by a predetermined non-negative number;
   (4) if the current value is less than one, setting it to approximately one; otherwise multiplying it by approximately two;
   (5) incrementing of the current value in any other way;
   any of (1), (2), (3), (4), or (5) above, and then limiting the current value so that it does not exceed the greater of: a) a predefined first positive number, and b) a predefined second positive number divided by the fixed size corresponding to the particular class instance;

(p) establishing a global class set; said global class set being an instance of said class set;

(q) receiving a global allocation request of a global allocation size and a global allocation count, said global allocation size being one of the members of said fixed size set; said global allocation size and said global allocation count being part of said global allocation request;

(r) in response to said global allocation request, performing a global block allocation, said global block allocation comprising the steps of:
   i) identifying a global class, said global class being the member of said global class set, corresponding to said global allocation size according to said correspondence;
   ii) if said global class contains less blocks than said global allocation count, performing the steps of:
      incrementing of said preferred length of said global class by using said means for preferred length incrementing;
      estimating a count of blocks to request as a number equal to the greater of said preferred length and said global allocation count, the greater decremented by the current length of said global class;
      using a request to said external allocation, requesting and receiving memory blocks of amount equal to said count of blocks to request, and with size, equal to said global allocation size;

placing received blocks into said global class;

iii) taking from said global class blocks of count, equal to said global allocation count, and iv) returning to the requesting party these blocks, thus fulfilling said global allocation request;

(s) receiving an allocation request of an allocation size by an allocating thread, said allocation size being one of the members of said fixed size set; said allocating thread being one of said threads; said allocation size and said allocating thread being part of said allocation request;

(t) in response to said allocation request performing a block allocation; said block allocation comprising the steps of:

i) identifying said slot associated with said requesting thread;

ii) identifying a slot class, said slot class being said class from said class set from said slot, corresponding to said allocation size;

iii) if the identified slot class is empty, performing the steps of:

incrementing of said preferred length of said slot class, using said means for preferred length incrementing;

using a request to said global block allocation, requesting and receiving memory blocks of a size equal to said allocation size, and of a count substantially equal to the current value of said preferred length of said slot class, but not less than one;

placing received blocks into said slot class;

iv) taking one block from said slot class, and v) returning the block to the requesting party, thus fulfilling said allocation request;

(u) providing a means for class updating, said means for class updating referring to a class being updated; said class being updated being one of said classes in existence; said means for class updating comprising the steps of:

i) performing a check if said class being updated is too full; the decision about this using a method selected from the group consisting of:

said class being updated is never too full;

said class being updated is too full if its length is greater than the value of said preferred length thereof multiplied by a predetermined positive number;

said class being updated is too full if its length is greater than the value of said preferred length multiplied by approximately two;

said class being updated is too full if its length is greater than the smaller of: a) said preferred length thereof multiplied by a first predetermined positive number, and b) a second predetermined positive number;

ii) if said class being updated was found to be too full, performing the steps of:

determining a count of blocks to take, said count of blocks to take being a positive integer number, the value thereof selected from the group consisting of:

a predetermined positive integer number;

approximately the current length of said class being updated multiplied by a predetermined positive number;

approximately the half of the current length of said class being updated;

approximately the current length of said class being updated minus current value of said preferred length of said class being updated;

approximately the current length of said class being updated;

taking from said class being updated blocks of count equal to said count of blocks to take;

if said class being updated belongs to said global class set, disallocating the blocks been taken, using a request to said external disallocation with size corresponding to said fixed size corresponding to said class being updated; else performing a global disallocation, said global disallocation comprising a step of adding the blocks been taken to this member of said global class that corresponds to the size from said fixed size set corresponding to said class being updated according to said correspondence;

(v) establishing a means for regular updating; said means for regular updating carrying out repeatedly, at appropriate intervals, said means for class updating for substantially all said classes in said class set in all said slots, as well as for all said classes in said global class set; the updates being done frequently enough, so that all said classes for most of the time will not contain any blocks which would be taken from them by said means for class updating;

whereby the blocks, stored in any of said classes will be unavailable for any other purpose;

whereby the blocks, returned to said memory of said computer system, will be available for some other purpose, including for using them by said external allocation as blocks of the any of said fixed size, after appropriate splitting or coalescing;

whereby each of said slots, respectively said classes therein, will be accessed exclusively by the thread, associated with the slot;

whereby said classes from said global class set will be accessed concurrently in a serialized manner by various threads;

whereby the step of taking blocks from said class, belonging to said global class set, on average, is substantially faster than said external allocation;

whereby the step of taking blocks from said class, belonging to said class set in said slot, on average, is substantially faster than said global block allocation;

whereby plurality of said allocation requests for blocks of various of said fixed sizes will be issued by various of said threads;

whereby the actual length of said class, associated with particular fixed size and thread, will tend to grow during periods of more frequent allocations of blocks of this particular size that are requested by this particular thread, thus making possible performing the allocations and disallocations faster, due to less frequent requests to said global block allocation, said external allocation, and said external disallocation;

whereby the actual length of said class from said global class set, associated with particular fixed size, will tend to grow during periods of more frequent allocations of blocks of this particular size, requested by any thread, thus making possible performing allocations and disallocations faster, due to less frequent requests to said external allocation and said external disallocation;

whereby the actual length of said class, associated with particular fixed size and thread, will tend to decrease during periods of less frequent allocations of blocks of this particular size that are requested by this particular thread, thus releasing blocks from said class to said global class set, respectively to said computer system;

whereby the actual length of said class from said global class, associated with particular fixed size, will tend to decrease during periods of less frequent allocations of blocks of this particular size that are requested by any thread, thus releasing blocks from said class to said computer system.

2. The method for managing the allocation of memory blocks of claim 1, further comprising the steps of:

(a) receiving a disallocation request by a disallocating thread; said disallocation request being to disallocate a memory block, formerly been allocated by said block allocation; said disallocating thread being one of said threads; the size of the block being one of said fixed size set; the block, the size of the block, and said disallocating thread being part of said disallocation request;

(b) in response to said disallocation request performing a block disallocation; said block disallocation comprising the steps of:

i) identifying said slot associated with said disallocating thread;

ii) identifying a disallocation slot class, said disallocation slot class being said class in said class set in the identified slot, corresponding to the size of the block being disallocated according to said correspondence;

iii) if said disallocation slot class is empty, incrementing of said preferred length thereof, using said means for preferred length incrementing;

iv) placing the block being disallocated into said identified disallocation slot class;

whereby adding a block to said class, respectively said block disallocation, will be substantially faster than said external disallocation;

whereby plurality of said disallocation requests for blocks of various of said fixed sizes will be issued by various of said threads;

whereby some blocks might be allocated by one thread and disallocated by another thread;

whereby the preferred and actual lengths of said class, associated with particular fixed size and thread, will tend to grow during periods of more frequent disallocations of blocks of this particular size that are requested by this particular thread, thus making possible performing the allocations and disallocations faster;

whereby the actual length of said class, associated with particular fixed size and thread, will tend to decrease during periods of less frequent disallocations of blocks of this particular size that are requested by this particular thread, thus releasing blocks from said class to said memory of said computer system;

whereby the actual length of said class from said global class set, associated with particular fixed size, will tend to grow during periods of more frequent disallocations of blocks of this particular size, requested by any thread, thus causing performing both allocations and disallocations faster due to less frequent requests to said external allocation and said external disallocation.

3. The method for managing of allocation of memory blocks of claim 1, wherein said means for regular updating comprises the steps of:

(a) providing a service thread; said service thread being a separate stream of execution of programming instructions, running in parallel with said threads on said computer system; said service thread periodically carrying out said means for class updating for part of the instances of said classes in existence;

(b) establishing at least of one of so defined said service threads and running them in parallel with the rest of said threads on said computer system, wherein said service threads in combination carry out said means for class updating for substantially all the instances of said classes in existence;

whereby said means for class updating will be done in regular and timely manner.

4. The method for managing of allocation of memory blocks of claim 3, wherein said service thread farther performs a step, comprising collecting and returning to said computer system any resources that might be part of the implementation of said slot and of said associating means; the collecting being done for said slots, associated with said threads that no longer exist, whereby these resources will be released and made available for later reuse by said computer system in timely manner.

5. The method for managing of allocation of memory blocks of claim 3, wherein said computer system farther comprises a plurality of processors or CPUs; wherein said means for regular updating farther comprises the steps of:

(a) establishing a separate of said service threads for each of CPUs, and forcing it to run on essentially separate CPU;

(b) arranging each of said service threads being established to preferably carry out said means for class updating of said classes residing in said slots that are associated with said threads, running on the same CPU, as does said service thread itself;

whereby running the service thread on the same CPU as the client threads will improve the performance due to the decreased need for synchronization between the CPUs.

6. A method for managing of allocation of memory blocks in a computer system, said computer system:

(a) defining one or more threads, said one or more threads being the execution of sequence of programming instructions;

(b) running at least one of said threads in parallel;

(c) defining a fixed size, said fixed size being a positive integer number;

(d) providing a fixed size set, said fixed size set comprising at least one of said fixed size; said fixed size set being farther characterized by a maximal fixed size and a fixed sizes count;

(e) comprising a memory;

(f) providing an external allocation, said external allocation:

i) by a request, the request including a block size, the block size being one of the members of said fixed size set, the request also including a blocks count, ii) performing allocation of memory blocks or blocks of that blocks count from said memory of said computer system, each block of that block size;

(g) providing an external disallocation, said external disallocation:

i) by a request, the request including at least one block, previously been allocated by using of said external allocation, ii) performing disallocation of these blocks and returning them to said memory of said computer system;

said method for managing of allocation of memory blocks comprising the steps of:

(h) defining a class, said class:
  i) being capable of storing substantially arbitrary amount of blocks at a time;
  ii) providing means for adding to it and taking from it of an arbitrary amount of blocks at a time;
  iii) providing means for querying the length thereof, length being the count of the blocks currently therein;
  iv) comprising a preferred length, said preferred length being a variable, capable of storing a non-negative numeric value;
(i) defining a class set, said class set containing said classes of amount equal to said fixed sizes count;
(j) establishing a correspondence between said fixed sizes from said fixed size set and said classes from said class set; the correspondence being such that each member of said fixed size set corresponds to exactly one member of class set; the correspondence being sufficient to identify said class in particular fixed size set, given particular fixed size;
(k) defining a slot, said slot comprising an instance of said class set;
(l) providing an associating means; said associating means performing association between an instance of said slot with exactly one of said threads; the association being mutual, one to one; said associating means being sufficient to identify the slot, associated with particular thread;
(m) establishing a separate instance of said slot for each of said threads, thereby associating said slot instance with the particular of said threads, using said associating means;
(n) providing a means for decaying of preferred lengths; said means for decaying of preferred lengths performing decaying of the current values of said preferred length of all said classes in existence; the decaying being non-negatively correlated with the passing of time, the time being an adequate measure for the temporal relationships on said computer system;
(o) providing a means for preferred length incrementing; said means for preferred length incrementing referring to particular instance of said class; said means for preferred length incrementing performing modifying the current value of said preferred length of the particular instance of said class; said means for preferred length incrementing comprising a sequence of operations, selected from the group consisting of:
  (1) doing nothing;
  (2) if the current value is less than one, setting it to a predetermined positive number; otherwise firstly incrementing it by a predetermined non-negative number and then multiplying it by a predetermined positive number;
  (3) if the current value is less than one, setting it to a predetermined positive number; otherwise firstly multiplying it by a predetermined positive number and then incrementing it by a predetermined non-negative number;
  (4) if the current value is less than one, setting it to approximately one; otherwise multiplying it by approximately two;
  (5) incrementing of the current value in any other way;
  any of (1), (2), (3), (4), or (5) above, and then limiting the current value so that it does not exceed the greater of a predefined first positive number and a predefined second positive number divided by said fixed size corresponding to the particular instance of said class;
(p) receiving an allocation request for allocating blocks of an allocation count and of an allocation size by an allocating thread; said allocation size being one of the members of said fixed size set; said allocating thread being one of said threads; said allocation size, said allocation count, and said allocating thread being part of said allocation request;
(q) in response to said allocation request, performing a block allocation, said block allocation comprising the steps of:
  i) identifying said slot associated with said allocating thread;
  ii) identifying a slot class, said slot class being the member from said class set from identified slot, corresponding to said allocation size;
  iii) if said slot class contains less blocks than said allocation count, performing the steps of:
    incrementing of said preferred length of said slot class, using said means for preferred length incrementing;
    using a request to said external allocation, requesting and receiving memory blocks of a size equal to said allocation size and a count substantially equal to the current value of said preferred length of said slot class, but not less than said allocation count minus the current length of said slot class;
    placing received blocks into said slot class;
  iv) taking from said slot class blocks of the amount equal to said allocation count, and
  v) returning to the requesting party these blocks, thus fulfilling said allocation request;
(r) providing a means for class updating; said means for class updating referring to a class being updated; said class being updated being an instance of said class; said means for class updating comprising the steps of:
  i) performing a check if said class being updated is too full; the decision about this using a method from the group consisting of:
    said class being updated is never too full;
    said class being updated is too full if its length is greater than the value of said preferred length thereof multiplied by a predetermined positive number;
    said class being updated is too full if its length is greater than the value of said preferred length thereof multiplied by approximately two;
    said class being updated is too full if its length is greater than the smaller of: a) said preferred length thereof multiplied by a first predetermined positive number, and b) a second predetermined positive number;
  ii) if said class being updated was found to be too full, performing the steps of:
    determining a count of blocks to take; said count of blocks to take being a positive integer number, the value thereof chosen from the group consisting of:
      a predetermined positive integer number;
      approximately the current length of said class being updated multiplied by a predetermined positive number;
      approximately the current length of said class being updated;
      approximately the half of the current length of said class being updated;
      approximately the current length of said class being updated minus the current value of said preferred length thereof;

taking from said class being updated blocks of count equal to said count of blocks to take;

disallocating the blocks been taken by using a request to said external disallocation;

(s) establishing a means for regular updating; said means for regular updating carrying out repeatedly, at appropriate intervals, said means for class updating for substantially all said classes in said class set in substantially all said slots; the updates being done frequently enough, so that said classes for most of the time will not contain any blocks which would be taken from them by said means for class updating;

whereby the blocks, stored in said class will be unavailable for other purpose;

whereby the blocks, returned to said computer system, will be available for some other purpose, including for using them, after appropriate splitting and coalescing by said external allocation as blocks of potentially another fixed sizes;

whereby each of said slots, respectively said block lists therein, will be accessed exclusively by the thread, associated with the slot;

whereby taking a block from said class, respectively said block allocation, will be substantially faster than said external allocation;

whereby a plurality of said allocation requests for blocks of various of said fixed sizes will be issued by various of said threads;

whereby the actual length of said class, associated with particular fixed size and thread, will tend to grow during periods of more frequent allocations of blocks of this particular size that are requested by this particular thread, thus causing performing the allocations faster;

whereby the actual length of said class, associated with particular fixed size and thread, will tend to decrease during periods of less frequent allocations, of blocks of this particular size that are requested by this particular thread, thus releasing blocks from said class to said computer system.

7. The method for managing the allocation of memory blocks of claim 6, further comprising the steps of:

(a) receiving a disallocation request by a disallocating thread; said disallocation request being to disallocate a memory block, formerly been allocated by said block allocation; said disallocating thread being one of said threads; the block being disallocated, the size of this block, and said disallocating thread being part of said disallocation request;

(b) in response to said disallocation request, performing a block disallocation, which comprises the steps of:

i) identifying said slot associated with said disallocating thread;

ii) identifying a disallocation class, said disallocation class being the member of said class set in identified slot, corresponding to the size of the block being disallocated according to said correspondence;

iii) if said disallocation class is empty, incrementing of said preferred length thereof by using said means for preferred length incrementing;

iv) placing the block being disallocated into said identified disallocation class;

whereby adding a block to said class, respectively said block disallocation, will be substantially faster than said external disallocation;

whereby each of said slots, respectively said classes therein, will be accessed exclusively by the thread, associated with the slot;

whereby plurality of said disallocation requests for blocks of various of said fixed sizes will be issued by various of said threads;

whereby some blocks might be allocated by one thread and disallocated by another thread;

whereby the preferred and actual lengths of said class, associated with particular fixed size and thread, will tend to grow during periods of more frequent disallocations of blocks of this particular size that are requested by this particular thread, thus causing performing allocations and disallocations faster, due to less frequent requests to said external allocation and said external disallocation;

whereby the actual length of said class, associated with particular fixed size and thread, will tend to decrease during periods of less frequent disallocations of blocks of this particular size, requested by this particular thread, thus releasing blocks from said class to said computer system.

8. The method for managing of allocation of memory blocks of claim 6, wherein said means for regular updating comprises the steps of:

(a) providing a service thread; said service thread being a separate stream of execution of programming instructions; said service thread periodically carrying out said means for class updating for part of the instances of said classes in existence;

(b) establishing at least of one of so defined said service thread and running them in parallel with the rest of said threads on said computer system, wherein said service threads in combination carry out said means for class updating for substantially all the instances of said classes in existence;

whereby said means for class updating will be performed in a regular and timely manner.

9. The method for managing of allocation of memory blocks of claim 8, wherein said service thread farther performs a step, comprising periodical collecting and returning to said computer system of any resources that are part of the implementation of said slot and of said associating means; the collecting being done for said slots associated with said threads that no longer exist, whereby these resources will be released and made available for reusing by said computer system in timely manner.

10. The method for managing of allocation of memory blocks of claim 8, wherein said computer system farther comprises a plurality of processors or CPUs; wherein said means for regular updating farther comprises the steps of:

(a) establishing a separate of said service threads for each of CPUs, and forcing it to run on a separate CPU;

(b) arranging each of said service threads being established to preferably carry out said means for class updating of said classes residing in said slots that are associated with said threads, running on the same CPU, as does said service thread itself;

whereby running the service thread on the same CPU as the client threads will improve performance due to the decreased need for synchronization between CPUs.

11. A method for managing of allocation of memory blocks in a computer system, said computer system:

(a) defining a fixed size, said fixed size being a positive integer number;

(b) providing a fixed size set, said fixed size set comprising a plurality of said fixed sizes; said fixed size set being farther characterized by a maximal fixed size and a fixed sizes count;

(c) providing an external allocation, said external allocation performing allocation of a memory block or block of size, being one of said fixed sizes in said fixed size set; the size being part of the request for said external allocation;

said method for managing of allocation of memory blocks comprising the steps of:

(d) considering said fixed sizes in said fixed size set being ordered incrementally by their values, establishing a correspondence between the zero-based indexes in this ordering and said fixed sizes in said fixed size set; said correspondence being one to one;

(e) determining a common divisor, said common divisor being such a positive integer number that divides each of said fixed sizes from said fixed size set without residue;

(f) establishing an index array, each entry in said index array being capable of storing a number between zero and said fixed sizes count; said index array being of size equal to said maximal fixed size divided by said common divisor;

(g) initializing of said index array in such a way that at each position it contains: the index, according to said correspondence, of the minimal member of said fixed size set such that said fixed size, corresponding to that index according to said correspondence, is not less than the position multiplied by said common divisor;

(h) receiving an allocation request of a request size; said allocation request being a request to allocate memory block of the request size; said request size being a positive integer number not greater than said maximal fixed size; said request size being part of said allocation request;

(i) in response to said allocation request, performing a block allocation, said block allocation comprising the steps of:
  i) estimating a position, the position being an integer number, by the formula: the integer part of: said request size plus said common divisor minus one divided by said common divisor;
  ii) taking the value placed at so estimated position in said index array;
  iii) using this value as index according to said correspondence, identifying corresponding to it said fixed size,
    whereby the identified fixed size will be the smallest in said fixed size set that is not less than said request size;
  iv) using said external allocation, allocating a block of identified fixed size;
  v) returning the allocated block to the requesting party and thus fulfilling said allocation request;

whereby finding of the smallest member of said fixed size set that is not less than said request size will require only a lookup in said index array and a few arithmetic calculations; whereby the size of said index array will be smaller than said maximal fixed size by a factor of said common divisor.

12. The method for managing of allocation of memory blocks of claim 11, wherein said computer system further comprises:

(a) providing an external disallocation, said external disallocation performing disallocation of a block, previously been allocated by said external allocation; a block and the corresponding to it said fixed size being part of each request for said external disallocation;

said method for managing of allocation of memory blocks farther comprising:

(b) receiving a disallocation request; said disallocation request being a request to disallocate a block, formerly been allocated by said block disallocation; the block and its actual size being part of said disallocation request;

(c) in response to said disallocation request, performing a block disallocation; said block disallocation comprising the steps of:
  i) estimating a position, the position being an integer number, by the formula: the integer part of: the actual block's size divided by said common divisor plus one;
  ii) taking the value placed at the estimated position in said index array;
  iii) decrementing it by one;
  iv) using this value as index according to said correspondence, identifying said fixed size, corresponding to it;
    whereby identified fixed size is the greatest in said fixed size set that is not greater than the actual size of the block;
  v) using said external disallocation, disallocating the block of said identified fixed size;

whereby finding of the greatest member of said fixed size set that is not greater than the block size will require only a lookup in said index array and a few arithmetic calculations; whereby said index array will be used in both said block allocation and said block disallocation.

13. A method for serialization in a parallel computing environment, said parallel computing environment comprising:

(a) a shared object;

(b) an owning thread; said owning thread being an execution of stream of programming instructions;

(c) an alien thread; said alien thread being an execution of stream of programming instructions;

(d) wherein said alien thread and said owning thread run in parallel in said computing environment;

(e) wherein said alien thread and said owning thread try to access said shared object in a substantially asynchronous and parallel manner;

(f) whereby the actual access to said shared object needs to be serialized so that at most one of said owning thread and said alien thread actually accesses said shared object at the same time;

said method for serialization in a parallel computing environment comprising the steps of:

(g) providing means for suspending of said owning thread; suspending being defined as temporary stopping the process of execution of programming instructions; said means for suspending being able to be initiated by a programming instruction executed by said alien thread;

(h) providing means for resuming of said owning thread; resuming being defined as resuming the process of execution of programming instructions by said owning thread, been previously suspended; said means for resuming being able to be initiated by a programing instruction executed by said alien thread;

(i) establishing and associating of a boolean flag with said shared object, said boolean flag:
  i) being capable of keeping one of the two distinctive values true and false at a time;
  ii) being initially set to value false;
  iii) being accessible by said owning thread for writing, that is for changing its value; the writing being done in an atomic programming instruction; the atomic programming instruction being defined as one that once started, cannot be interrupted before entirely finished;
  iv) being accessible by said alien thread for reading by an atomic programming instruction;

v) values being written to it by said owning thread being substantially instantly visible, if read by said alien thread;

(j) providing an owning thread access, said owning thread access being a serialized access by said owning thread to said shared object; said owning thread access performing the steps of:
  i) writing by said owning thread value true to said boolean flag;
  ii) performing the actual access by said owning thread to said shared object;
  iii) writing by said owning thread a value false to said boolean flag;

(k) providing an alien thread access attempt, said alien thread access attempt being an attempt for serialized access by said alien thread to said shared object; said alien thread access attempt comprising the successive steps of:
  i) suspending of said owning thread, using said means for suspending, initiated by said alien thread;
  ii) checking by said alien thread of the current value of said boolean flag;
  iii) if said boolean flag contains value true, resuming of said owning thread using said means for resuming, and terminating said alien thread access attempt as unsuccessful; otherwise
  iv) performing the actual access by said alien thread to said shared object;
  v) resuming of said owning thread using said means for resuming, initiated by said alien thread;
  vi) finishing said alien thread access attempt as successful;

whereby a plurality of said owning thread accesses and said alien thread access attempts will be performed by said owning thread and said alien thread, respectively, in substantially asynchronous and parallel manner;

whereby said boolean flag will contain value true during periods in which said shared object is being actually accessed by said owning thread;

whereby said owning thread will be suspended during periods in which said shared object is being actually accessed by said alien thread; whereby all of said owning thread accesses will succeed;

whereby some of said alien thread access attempts might fail, in case of contention between said owning thread and said alien thread for said shared object;

whereby the actual accesses of said alien thread and said owning thread to said shared object are serialized;

whereby, provided that said alien thread accesses said shared object much less frequently than does said owning thread, there will be negligible performance degradation caused by the serialization; whereby there are no mutexes involved.

* * * * *